United States Patent
Cassen et al.

[19]

[11] Patent Number: 6,114,986

[45] Date of Patent: Sep. 5, 2000

[54] DUAL CHANNEL MICROWAVE TRANSMIT/RECEIVE MODULE FOR AN ACTIVE APERTURE OF A RADAR SYSTEM

[75] Inventors: John W. Cassen, Sykesville, Md.; Stephanie A. Parks, Cornwall, United Kingdom; Edward L. Rich, III, Arnold, Md.; Gary N. Bonadies, Laurel, Md.; Gary L. Ferrell, Pasadena, Md.; John S. Fisher, Ellicott City, Md.; John W. Gipprich, Millersville, Md.; John D. Gornto, Columbia, Md.; Daniel J. Heffernan, Severna Park, Md.; David A. Herlihy, Ellicott City, Md.; Andrew J. Piloto, San Diego, Calif.; Patrick K. Richard; David W. Strack, both of Baltimore, Md.; Scott K. Suko, Elkridge, Md.

[73] Assignee: Northrop Grumman Corporation, Los Angeles, Calif.

[21] Appl. No.: 09/158,829

[22] Filed: Sep. 23, 1998

Related U.S. Application Data

[60] Provisional application No. 60/076,707, Mar. 4, 1998.

[51] Int. Cl.[7] .................................................. G01S 7/28
[52] U.S. Cl. ............................................ 342/175; 342/372
[58] Field of Search .................................. 342/175, 153, 342/154, 157, 158, 200, 201, 202, 371, 372, 375

[56] References Cited

U.S. PATENT DOCUMENTS

| | | | |
|---|---|---|---|
| 3,643,075 | 2/1972 | Hayes | 702/57 |
| 3,750,175 | 7/1973 | Lockerd et al. | 342/371 |
| 3,818,386 | 6/1974 | Granberry | 333/33 |
| 3,899,720 | 8/1975 | Peterson | 317/101 D |
| 4,823,136 | 4/1989 | Nathanson et al. | 342/368 |
| 4,870,421 | 9/1989 | Peil et al. | 342/175 |
| 4,967,201 | 10/1990 | Rich, III | 342/175 |
| 5,140,333 | 8/1992 | Parker | 342/371 |

(List continued on next page.)

OTHER PUBLICATIONS

"Microwave multichip modules using low cost microwave chip on flex packaging technology", McNulty, M.; Schnell, J.; Nixon, D., Multichip Modules and High Density Packaging, 1998. Proceedings. 1998 International Conference on , 1998 , pp. 262–267, 1998.

"Technologies for miniaturisation of advanced spaceborne payloads", Arnold, J.; Jones, M.R.B., Electronics & Communication Engineering Journal vol. 4 3 , Jun. 1992, pp. 131–139, 1992.

"High density microwave packaging program phase 1–Texas Instruments/Martin Marietta team", Reddick, J.A., III; Peterson, R.K.; Lang, M.; Kritzler, W.R.; Piacente,P.; Komrumpf, W.P., Microwave Symposium Digest, 1995., IEEE MTT–S International, 1995 , Page( 1995.

"Ground connection soldering techniques of high density ceramics substrate of transmit/receive module and its reliability", Wang Tingyue; Cui Dianheng; Yu Shenlin; Tang Jun; Yan Wei, Electronics Manufacturing Technology Symposium, 1997., Twenty–First IEEE, 1997.

*Primary Examiner*—John B. Sotomayor

[57] ABSTRACT

Two discrete transmit/receive (T/R) channels are implemented in a single common T/R module package having the capability of providing combined functions, control and power conditioning while utilizing a single multi-cavity, multi-layer substrate comprised of high temperature cofired ceramic (HTCC) layers. The ceramic layers have outer surfaces including respective metallization patterns of ground planes and stripline conductors as well as feedthroughs or vertical vias formed therein for providing three dimensional routing of both shielded RF and DC power and logic control signals so as to configure, among other things, a pair of RF manifold signal couplers which are embedded in the substrate and which transition to a multipin blind mate press-on RF connector assembly at the front end of the package. DC and logic input/output control signals are connected to a plurality of active circuit components including application specific integrated circuits (ASICs) and monolithic microwave integrated circuit chips (MMICs) via spring contact pads at the rear of the package. The T/R module is one module of an array of like T/R modules coupled to an active aperture of a radar system.

85 Claims, 26 Drawing Sheets

U.S. PATENT DOCUMENTS

| | | | |
|---|---|---|---|
| 5,155,492 | 10/1992 | Hopwood et al. | 342/372 |
| 5,214,498 | 5/1993 | Lehman et al. | 257/678 |
| 5,225,841 | 7/1993 | Krikorian et al. | 342/204 |
| 5,276,455 | 1/1994 | Fitzsimmons et al. | 343/777 |
| 5,339,083 | 8/1994 | Inami | 342/157 |
| 5,353,033 | 10/1994 | Newberg et al. | 342/375 |
| 5,386,339 | 1/1995 | Polinski, Sr. | 361/719 |
| 5,431,582 | 7/1995 | Carvalho et al. | 439/372 |
| 5,442,364 | 8/1995 | Lee et al. | 342/372 |
| 5,457,607 | 10/1995 | Carvalho | 361/740 |
| 5,559,519 | 9/1996 | Fenner | 342/174 |
| 5,745,076 | 4/1998 | Turlington et al. | 342/372 |
| 5,854,610 | 12/1998 | Wojtowicz et al. | 342/372 |
| 5,861,845 | 1/1999 | Lee et al. | 342/375 |
| 5,940,031 | 8/1999 | Turlington et al. | 342/372 |

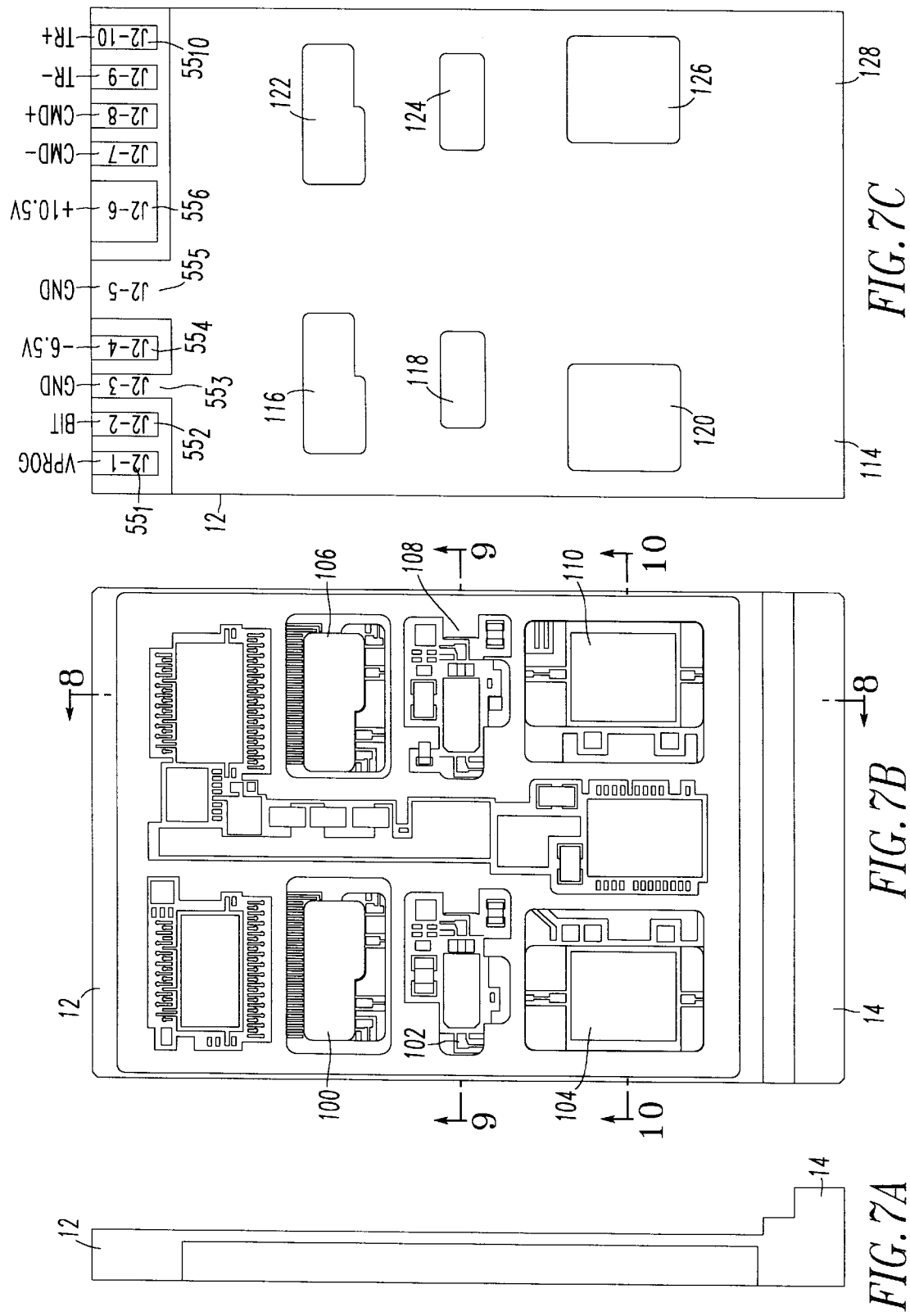

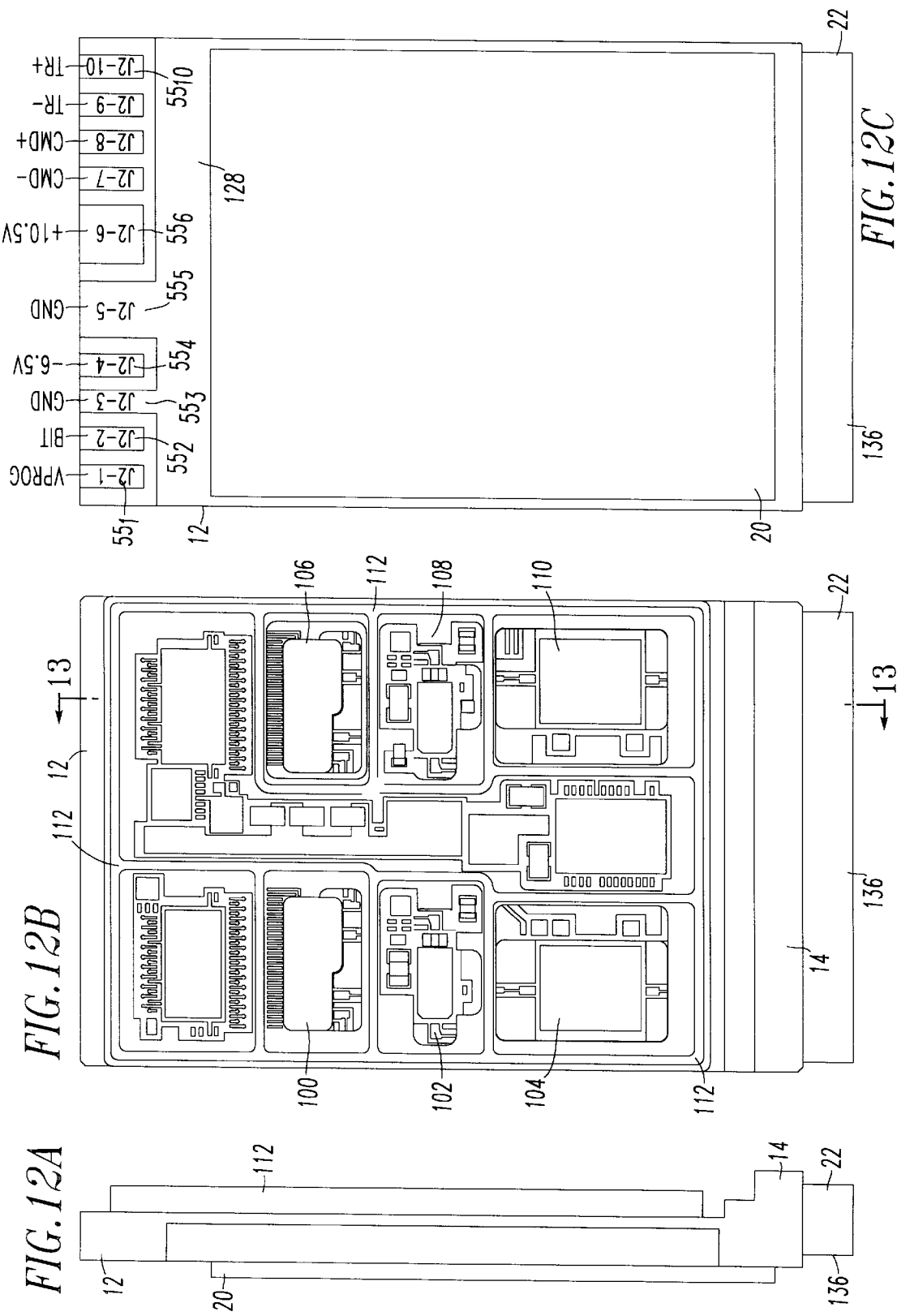

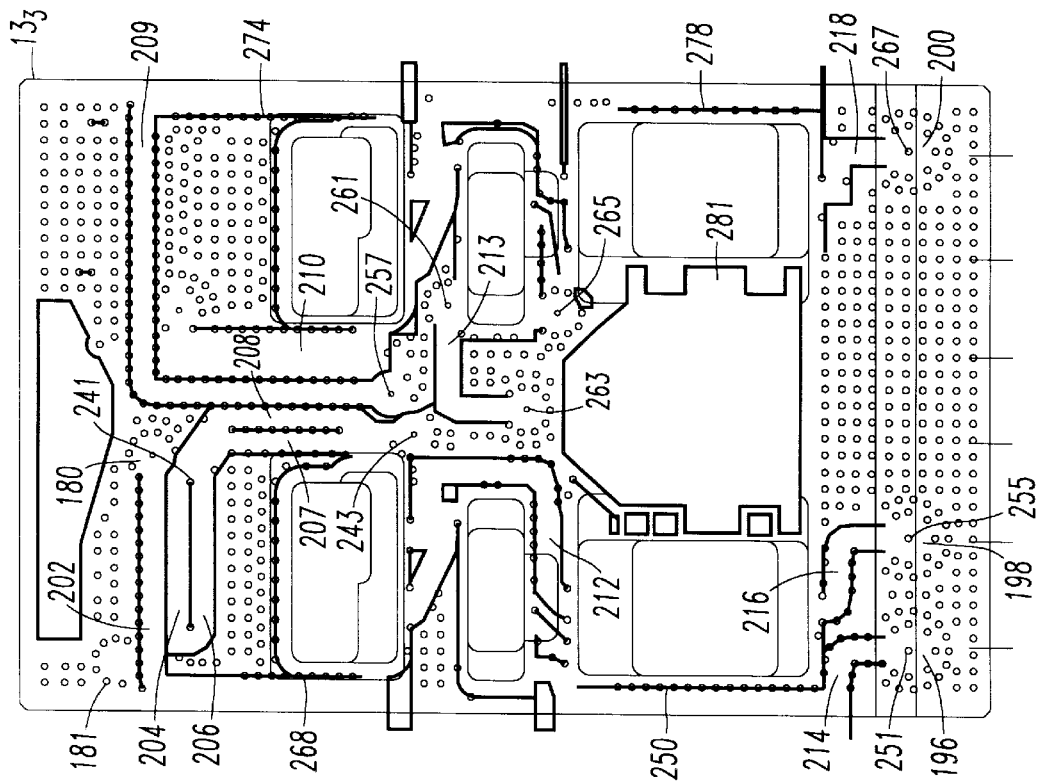
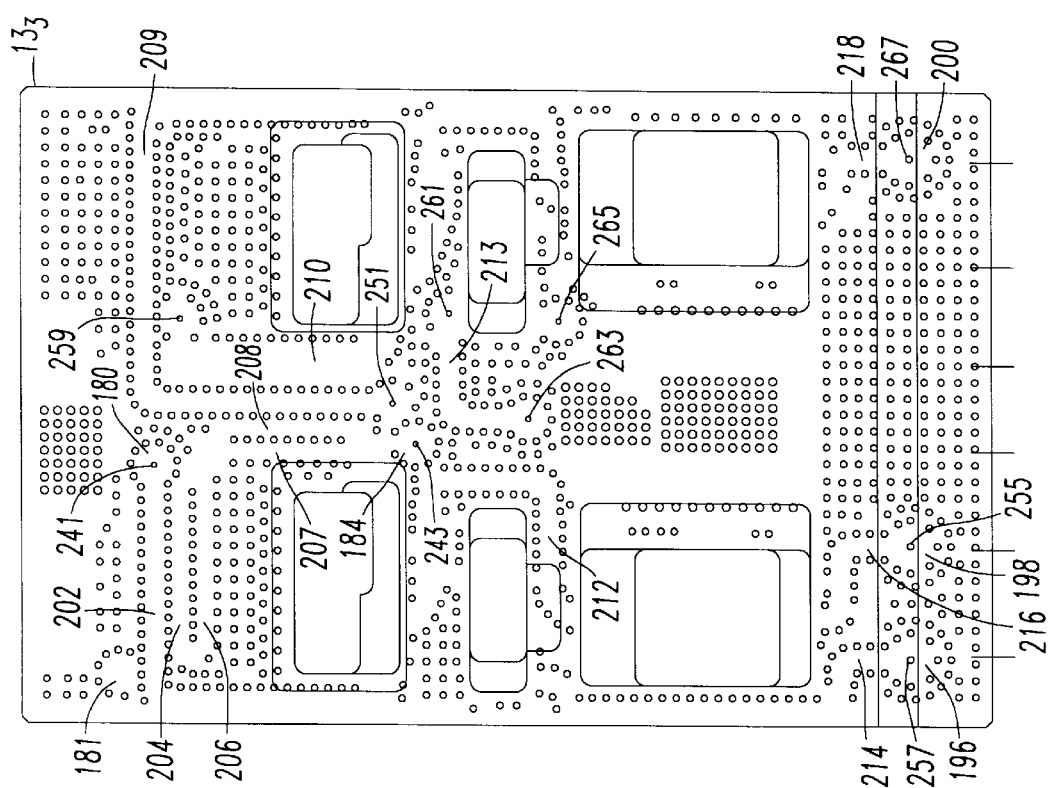

DUAL CHANNEL MICROWAVE TRANSMIT/RECEIVE MODULE FOR AN ACTIVE APERTURE OF A RADAR SYSTEM This application claims priority on provisional application Ser. No. 60/076,707 filed on Mar. 4, 1998, the entire contents of which are hereby incorporated by reference.

BACKGROUND OF THE INVENTION

1. Cross Reference to Related Applications

This application is related to U.S. Ser. No. 09/158,832 (Northrop Grumman Docket No. BD-98-112) entitled, "Transmit/Receive Module Having Multiple Transmit/Receive Paths With Shared Circuitry", filed in the names of John W. Cassen et al on Sep. 23, 1998; and U.S. Ser. No. 09/158,827 (Northrop Grumman Docket No. BD-98-111) entitled "Antenna Assembly Including Dual Channel Microwave Transmit/Receive Modules", filed in the names of John W. Cassen et al on Sep. 23, 1998.

Both of these applications are assigned to the assignee of this invention and, moreover, are intended to be incorporated herein by reference.

2. Field of the Invention

This invention relates generally to transmit/receive (T/R) circuit modules utilized, for example, in phased array radar systems and, more particularly, to a dual channel T/R module where two discrete T/R RF signal channels are implemented side-by-side in a common package.

3. Description of Related Art

Phased array radars utilizing electronically scanned antenna arrays, also referred to as active apertures, require many individually controllable T/R modules which are arranged in an array. The T/R modules are connected to frontally located radiator elements which collectively generate a transmitted radar beam. The beam is normally energized, shaped and directed in azimuth and elevation under electronic control of the signals applied to the individual radiators.

A phased array radar system generates successive transmit pulses which are distributed through a transmit manifold and microwave circuitry to the various antenna radiators. Between transmit pulses, the radar system receives and processes successive return signals from the antenna radiators. The return signals are processed through microwave circuitry in the T/R module, collected through a receive manifold, and then processed in the system for target identification.

Such a radar system also employs a programmed digital processor to control amplification, attenuation, and phase shifting of transmit and receive signals, thereby determining the amplitude, direction, and shape of the aggregate RF energy beam transmitted by or received by the aperture. Different phase shifts cause different transmit or receive circuit delays in delivery of individual RF radiator signals to control the pattern of RF energy wavefronts associated with the different radiators and which are combined to define the direction and shape of a transmitted or received antenna beam.

Each T/R module according to the known prior art typically includes a housing structure or package including microwave signal processing means for processing transmitted and received radar signals, control signal processing means interconnected with microwave signal processing components for coupling control signals thereto; and power conditioning means comprising a number of power conditioning components selectively interconnected with the microwave signal processing components and the control signal processing components for providing electrical power thereto. Because such apparatus operates at relatively high power levels, there is also normally provided means for dissipating the heat generated by the various components, particularly the microwave power amplifiers and the power conditioning components associated therewith.

Accordingly, there is an ongoing development in this field of microwave technology to produce T/R modules that are smaller, lighter in weight and lower in cost, while at the same time providing an improvement in operating performance and reliability as well as enhancing ease of installation in an antenna assembly.

One known T/R module developed by the assignee of this invention is shown and described in U.S. Pat. No. 4,967,201, entitled, "Multi-Layer Single Substrate Microwave Transmit/Receive Module", granted to Edward L. Rich, III, on Oct. 30, 1990, one of the inventors named in this application. The module disclosed therein is referred to as a "sugar cube" T/R module and includes a single multi-layer substrate having at least two opposed mounting surfaces. The substrate includes a plurality of integrated dielectric layers, electrical conductors and thermal conductors selectively interconnected between the layers of the substrate. Microwave signal processing means is mounted on at least one of the mounting surfaces of the substrate for processing microwave radar signals. Control signal processing means is also mounted on at least one of the mounting surfaces of the substrate for providing control signals for the microwave signal processing means. Power conditioning means is additionally mounted on at least one of the mounting surfaces of the substrate for providing power to power the microwave signal processing means and control signal processing means. A heat sink interface is coupled to a set of thermal conductors or vias passing vertically through the substrate layers and which are positioned in thermal proximity to selected portions of the microwave signal processing means, the power conditioning means, and the control signal processing means for conducting thermal energy away from the heat generating elements mounted on the substrate to a heat sink.

The "sugar cube" module comprises a relatively early T/R module design in which basic transmit and receive functions, as then conceived, are embodied in a single modular T/R unit with the operating structure supporting such functions integrated together on a main substrate. While presumably operating as intended, certain inherent deficiencies have been found to exist. For example, while the "sugar cube" module exhibits a compact appearance, it embodies only a single T/R channel and is limited by its design to relatively low RF power output operation and is structurally limited to a single RF connection to an RF manifold. Also, while this type of module has a back-end plug-in capability for certain electrical connections, it has no easy plug-in capability for antenna connections. Instead, each module has an antenna radiator built into its front end, thereby creating installation problems in aligning misaligned radiators among installed T/R modules. This is due to the fact that transmitted and received beams require aligned antenna radiators to enable beam control in accordance with system commands.

Moreover, the module-integrated radiator of the "sugar cube" module limits bandwidth during transmission and reception and, because of its simple unpolarized patch structure, restricts radiator operation to a fixed polarization. The "sugar cube" T/R module is thus characterized with polarization inflexibility, whereas good system design requires polarization flexibility to permit variable settings of radiation properties including bandwidth and polarization. For example, if a received signal carries a high noise level in a particular polarization, it is desirable to have the flexibility to control the polarization to an angle where the noise is reduced. In this manner, the signal-to-noise ratio is enhanced and weaker signals can be detected with substantially reduced noise interference.

Further, in an antenna assembly employing "sugar cube" T/R modules, the pin within the single coaxial RF connector between each sugar cube module and the system manifold is susceptible to excessive axial movement in response to antenna mechanical vibrations. Such pin movements can change RF path lengths thereby causing increased noise level and erroneous phase changes which produce beam dispersion and thereby affect intended beam control.

Among other problems encountered with the "sugar cube" T/R module is the removal of heat generated by the active components therein. Thermal conductors, coursing vertically through the layered structure of the module to a heat transfer interface provides only limited heat transfer for removal of heat from the active circuit components. As a result, poor thermal performance contributes to a relatively low RF-power-output capability.

More recently, an improved T/R module has been developed by the assignee of this invention and is disclosed in U.S. Pat. No. 5,745,076, entitled "Transmit/Receive Module For Planar Active Apertures", issued to Thomas R. Turlington et al on Apr. 28, 1998. The T/R module disclosed therein and referred to by the assignee as a "StackPak" comprises a module configuration which plugs into the backside of an active aperture and includes discrete RF, DC power and data distribution manifolds which are planar in configuration and are stacked together one on top of the other between a cold plate and an antenna assembly, with the antenna elements and circulators being assembled in a single physical unit which forms the front layer of the aperture.

The T/R module itself comprises a multi-chip microwave package comprised of multiple layers of high temperature cofired ceramic (HTCC) including ground planes, stripline, data and DC interconnects, thermal vias and RF inputs/outputs running through the RF assembly for a plurality of monolithic microwave integrated circuit chips (MMICs) which are located in cavities formed in the RF assembly layer. The module's architecture includes a single transmit/receive RF signal channel that shares its control functions of gain trim, phase shift and intermediate power amplification in both the transmit and receive modes of operation.

When "StackPak" T/R modules are installed in place, they are disposed against the cold plate for removal of internally generated heat. Each T/R module, moreover, has connector pins extending forwardly from a front module side to make all power, control and RF connections required for the module when it is installed by plugging into the back of the antenna assembly. The forwardly extending pins pass through respective sleeves which, in turn, extend through the stacked layers, thereby enabling the necessary connections to be made between the pins and the antenna radiators, the RF manifolds, and the control and power systems in the various layers.

The "StackPak" scheme thus resembles "Swiss cheese" in the sense that the sleeves pass through assembly openings to provide for the necessary DC power, DC digital control, and RF signal connections for the T/R modules.

In dissipating heat to a heat exchanger, a "StackPak" T/R module can use only a portion of its front surface for the dissipating heat transfer. Gallium arsenide integrated circuits are normally used for RF power amplification in T/R modules, and the temperature and reliability specifications for these devices require increasing heat dissipation for increasing power rating. Thus, "StackPak" T/R modules exhibit relatively poor heat dissipation, and consequently restrict RF power generation, largely because the frontal "real estate" of the T/R module must share heat transfer and electrical connection functions thereby operating with a highly restricted surface area for heat removal.

While the substrate-based structure of the "StackPak" employs cavities in an RF assembly layer for placement of various RF semiconductor devices to support RF circuitry in a single RF channel, there is no provision for semiconductor device layout or RF circuit routing and RF shielding and isolation between or among two or more discrete T/R channels.

The "StackPak" T/R module is also limited by the fact that it employs RF input/output coaxial connectors on three different edges of the module thereby adversely affecting module installation facility, RF circuit length, RF power loss, and RF channel isolation.

The "StackPak" T/R module is furthermore hindered by limited capacity for interfacing DC power from an external power supply to the T/R module. Thus, in an active aperture, a low voltage bus normally supplies power to T/R modules from an external power supply, i.e., a DC converter which converts a main source voltage (such as 240 V) to a low DC voltage (such as 10 V or 11 V) for module use. The weight of the low voltage DC (LVDC) bus increases in proportion to the square of the length of the bus path and in proportion to the square of the current carried by the LVDC. Increased RF output power requires increased transmit current pulses, which place increased peaking current demands on the input power supply circuitry, i.e., increased bus path cross-section and weight if increases in bus power losses and heat generation are to be avoided. These principles also apply to any input LVDC path length connected to the external LVDC bus path and extending within the T/R module to power distribution points. However, the internal LVDC bus path length would normally be relatively short and have less significance to bus power loss and heat generation than the external LVDC bus would have. In accordance with good design practice, the LVDC bus structure desirably keeps losses at or below a specified percentage of RF power output as a control on efficiency in producing output RF output power. Thus, RF power output increases require significantly increased LVDC bus size and weight.

Thus, the design of the "StackPak" T/R module substantially affects the RF power output, since excessive bus size and weight is required to reach desirable levels of RF output power. Other factors including poor heat dissipation also limits RF output power in the "StackPak" design. Although the module can achieve some cost improvement through chip-to-chip wire bonding, but it still carries cost disadvantages resulting from factors including the use of multiple housing/interconnect/seal pieces.

Notwithstanding the advances made in the art by the above-mentioned T/R modules, there is nevertheless an ongoing need for improvements, which result in reduced weight, cost and size, while at the same time maintaining required performance parameters.

In achieving further development of T/R modules, it is desirable that the following objectives be met: (1) Maximum RF output power; (2) Minimum shielded RF circuitry routing within module; (3) Minimum received noise figure; (4)

Maximum isolation between RF channels to facilitate proper beam steering and shaping; (5) Phase adjustability for facilitated beam steering; (6) Minimum heat generation; (7) Minimum thermal resistance allowing maximum heat dissipation; (8) Minimum semiconductor junction temperature rise; (9) Minimum inflow power current; (10) Minimum logic circuit routing; and, (11) Relative ease of installation in an antenna assembly.

In summary, the prior art in its previous and current states has generally been deficient in meeting the above mentioned objectives individually and collectively. The subject invention, therefore, is directed to an improved T/R module which meets these objectives while providing reduced cost, greater reliability, and greater maintainability.

SUMMARY

Accordingly, it is an object of the present invention to provide an improvement in microwave transmit/receive (T/R) modules.

It is a further object of the present invention to provide an improvement in T/R modules used in connection with an active aperture of a pulse radar system.

And it is yet another object of the invention to provide an improved package for T/R modules utilized in a phased array radar system.

And it is yet a further object of the invention to provide a low cost package for a transmit/receive module which results in reduced thermal impedance while providing high channel isolation between a plurality of discrete transmit/receive channels located side-by-side in a common housing structure.

The foregoing and other objects are achieved by a T/R module wherein a plurality, preferably two, discrete transmit/receive (T/R) channels are implemented in a single common package and having the capability of providing combined functions, control and power conditioning while utilizing a single multi-cavity, multi-layer substrate comprised of high temperature cofired ceramic (HTCC) layers. The ceramic layers have outer surfaces including respective metallization patterns of ground planes and conductors as well as feedthroughs or vertical vias formed therein for providing three dimensional routing of both RF and DC signals so as to configure, among other things, a pair of RF manifold signal couplers which are embedded in the substrate and which transition to an RF interface including a multi-pin RF connector assembly at the front end of the package. The RF signal paths are enclosed in electrical shielding formed by parallel lines of vias and overlying stripline conductor elements. A DC and logic interface is located at the rear end of the package and includes means whereby DC power and control signals are connected to a plurality of active circuit components including application specific integrated circuit chips (ASICs) and monolithic microwave integrated circuit chips (MMICs) via spring contact pads. The MMICs, which include RF power amplification circuitry generate most of the heat, are located in multi-level cavities formed in the substrate and are bonded directly to a generally flat heat sink plate which is secured to the bottom of the substrate and acts as an efficient thermal interface to a cold plate type of external heat exchanger. DC power conditioning is also provided by a capacitive bank type of energy storage subassembly externally attached to the rear of the T/R module package for supplying supplementary power for peak power generation.

Further scope of applicability of the present invention will become apparent from the detailed description provided hereinafter. It should be noted, however, that the detailed description and specific example while indicating the preferred embodiment of the invention, is given by way of illustration only, since various changes, alterations and modifications coming within the spirit and scope of the invention will become apparent to those skilled in the art from this detailed description.

BRIEF DESCRIPTION OF THE DRAWINGS

The present invention will become more fully understood when considered in conjunction with the accompanying drawings, which are provided by way of illustration only and thus are not meant to be limitive of the present invention, and wherein:

FIGS. 7A–7D are side, top, bottom and front plan views of an unpopulated T/R module package shown in FIG. 1;

FIGS. 12A–12D are side, top, bottom and front plan views of an unpopulated T/R module package in accordance with the subject invention shown in FIGS. 7A–7D and now including a bottom heatsink plate attached thereto along with an RF coaxial connector assembly located at the front portion of the package;

FIGS. 19A–19B are illustrative of the via and top surface metallization pattern formed in connection with HTCC layer 3 shown in FIG. 14;

DETAILED DESCRIPTION OF THE INVENTION

Figure 1:
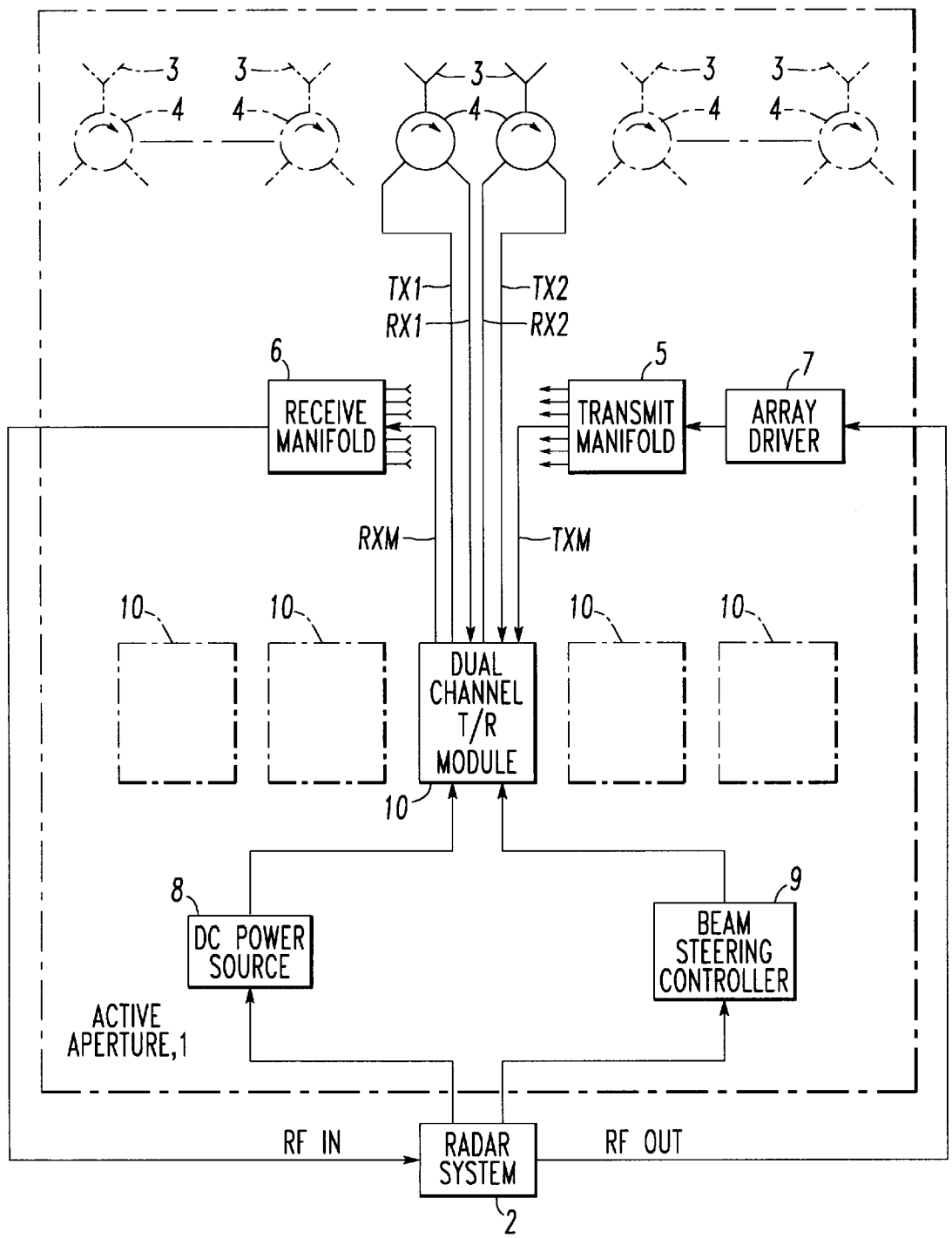
FIG. 1 is an electrical block diagram broadly illustrative of a phased array radar system including a T/R module in accordance with the subject invention.

Referring now to the drawings and more particularly to FIG. 1, disclosed thereat is a block diagram broadly illustrative of an active aperture 1 for a radar system 2 including a plurality of phased array antenna elements 3 coupled to a plurality of identical dual channel T/R modules 10 by way of respective RF circulators 4. Each T/R module 10 includes a pair of RF transmit ports TX1 and TX2 and a pair of receive ports RX1 and RX2 connected to separate antenna elements 3 and circulators 4 for implementing two separate and distinct T/R channels embodied within one common T/R module 10. Both T/R channels, moreover, share a common input port TXM from a transmit manifold 5 and a common output port RXM to a receive manifold 6 which form part of a common RF manifold for the system. The combined output from the receive manifold 6 is fed to the receiver section, not shown, of the radar system 2. RF pulses generated for transmission are fed to the transmit manifold 5 via an array driver 7. The six RF input/output ports TX1, TX2, RX1, RX2, TXM and RXM define an RF interface for the T/R module 10. The module 10, moreover, receives DC power from a DC source 8 and beam steering control signals are received from a beam controller 9 via a power/logic interface. All of these subsystems are under the control of a one or more microprocessors, not shown, located in the radar system 2.

Considering now the details of the preferred embodiment of the invention and as shown in FIGS. 2A–2D, the T/R module 10 exhibits an elongated relatively thin profile and implements a pair of discrete transmit/receive channels within a single common package including a multi-layer substrate structure 12 comprised of a plurality of high temperature co-fired ceramic (HTCC) layers, to be described hereinafter, bonded together in a generally flat, rectangular configuration including a relatively wide front end portion 14 and a relatively narrow rear portion 16. The substrate 12 acts as a means for interconnecting a number of active and passive components which will be described hereinafter for implementing a dual T/R function for a phased array radar system.

Figure 2A:
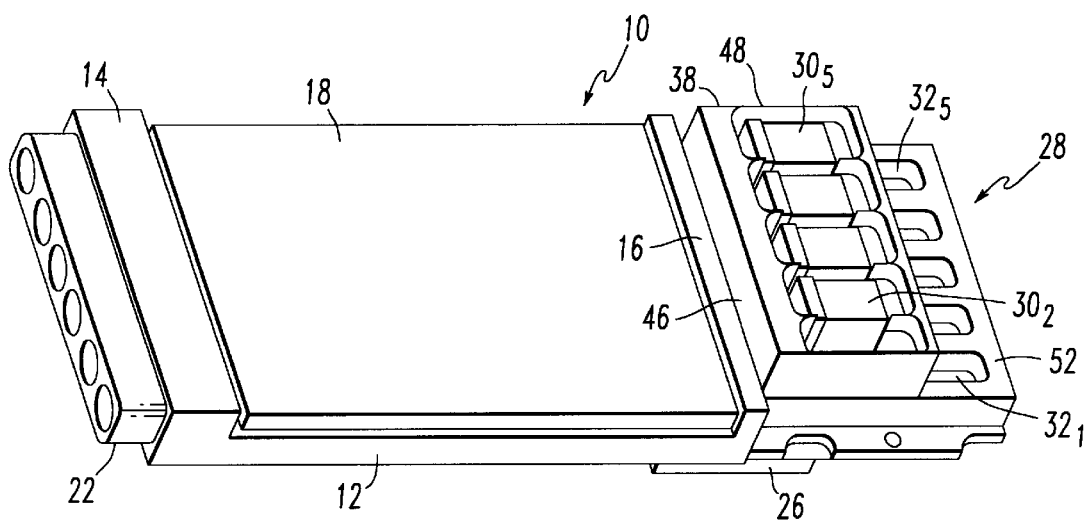
FIGS. 2A–2D are perspective top, side and bottom plan views of a T/R module in accordance with the preferred embodiment of the invention.
Figure 2B:
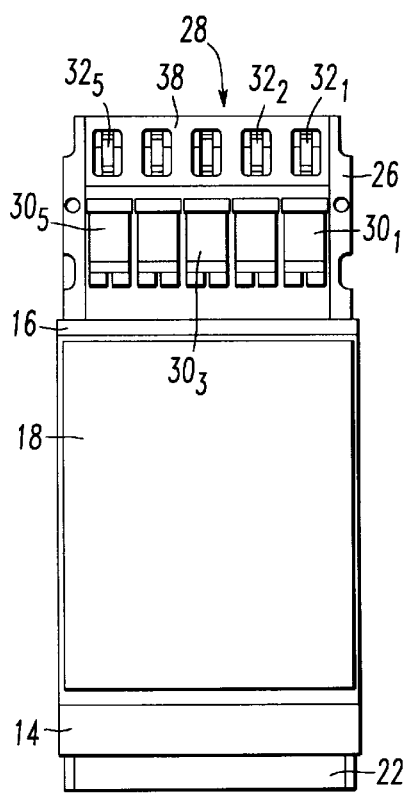
Figure 2C:
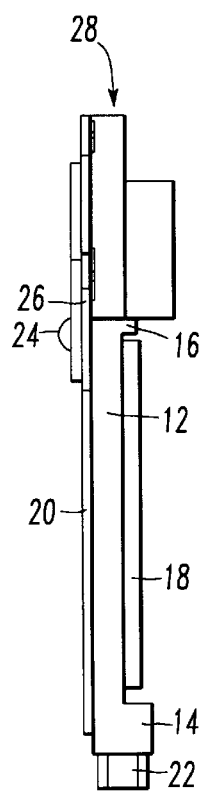
Figure 2D:
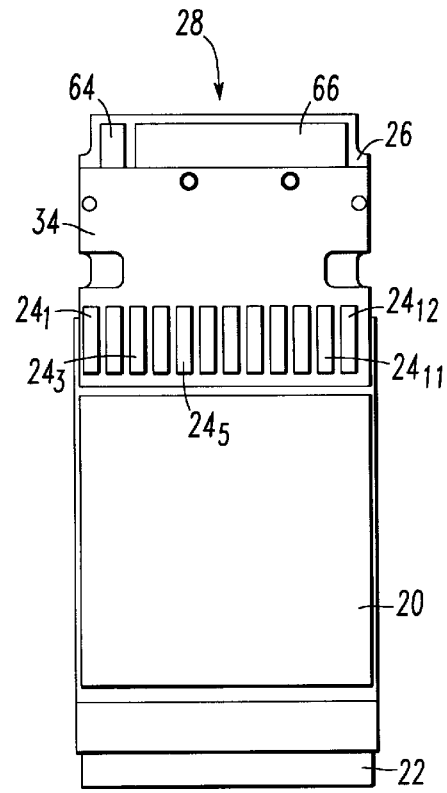
Figure 3:
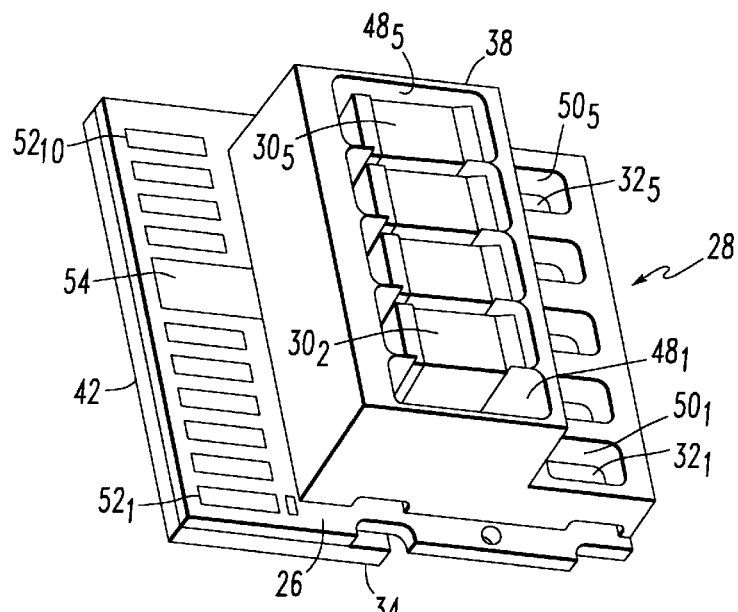
FIG. 3 is a perspective view of an energy storage capacitor bank located at the rear end of the T/R module shown in FIG. 1.

As shown in FIGS. 2A–2C, a flat metallized rectangular cover 18 fits over a metal ring frame, shown hereinafter, which is bonded to the top of the substrate 12 for protecting the electronic components located within the substrate as well as providing RF shielding therefor. A flat rectangular heat sink plate 20 is also bonded to the bottom of the substrate 12 as shown in FIG. 2D and acts as a thermal interface for spreading and transferring heat generated within the module 10 to an external heat exchanger, e.g. cold plate, not shown. At the forward end of the substrate 12, as best shown in FIG. 2A, are located six(6) discrete RF connectors located in a single connector subassembly 22 which can be easily plugged into the backside of an antenna array and which acts as an RF interface for all RF signals coupled to and from the module 10. These components are, moreover, brazed to the substrate 12 and form a package which is hermetically sealed.

All other electrical connections between the module 10 and external apparatus supplying, for example, DC power and control signals, are made through a DC/logic interface located at the other end of the substrate, with the heat sink plate 20 in between, and including a set of twelve(12) spring-like fingers $24_1, 24_2 \ldots 24_{12}$ (FIG. 2C) mounted on a small generally rectangular circuit board 26 (FIGS. 5A–5C) located on the bottom of the module 10 behind the heat sink plate 20. The circuit board 26 forms part of DC power storage system comprising a capacitive bank subassembly 28 including five(5) electrical capacitors $30_1, 30_2 \ldots 30_5$ and five(5) fuses $32_1, 32_2 \ldots 32_5$ (FIG. 2A), respectively connected in series with the capacitors $30_1 \ldots 30_5$ and whose purpose is to supply additional DC power to the module in a well known manner, during peak power operation.

The capacitive bank subassembly 28 is further shown in FIGS. 3, 4, and 5A–5D. In addition to the circuit board 26, the capacitive bank subassembly 28 additionally includes a flat cover member or "comb" 34 affixed to the bottom surface 36 of the circuit board 26 for protecting the fingers $24_1, 24_2 \ldots 24_{12}$ (FIG. 5C) and a relatively larger top member or "organizer" 38 affixed to the top surface 40 of the circuit board 26 for protecting the capacitors $30_1 \ldots 30_5$ and fuses $32_1 \ldots 32_5$ mounted thereon.

Figure 4:
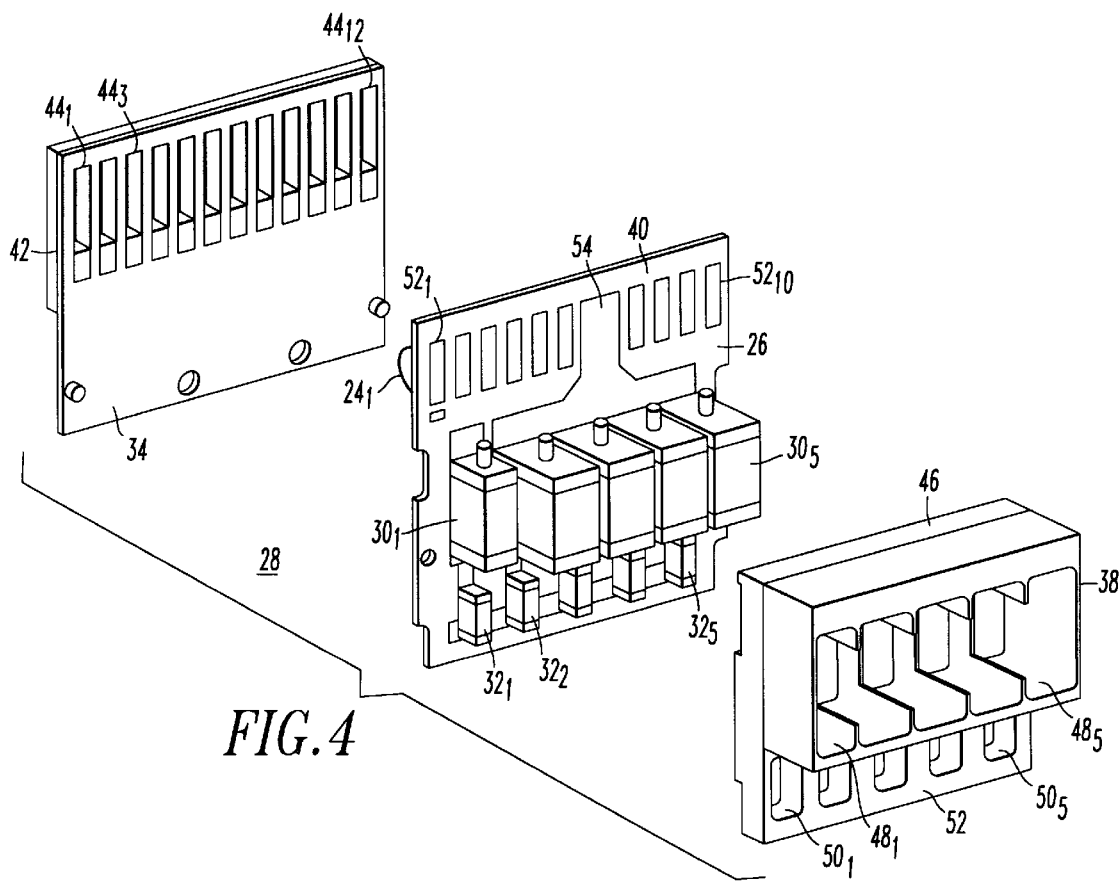
FIG. 4 is an exploded view of the capacitor bank shown in FIG. 3.

The members 34 and 38 are preferably comprised of molded plastic. As shown in FIG. 4, the "comb" 34 includes an enlarged section 42 at one end which spans the width thereof and includes twelve relatively short identical parallel slots $44_1, 44_2, \ldots 44_{12}$ which are adapted to fit over and around fingers $24_1, 24_2 \ldots 24_{12}$ shown in FIGS. 5B and 5C.

The "organizer" 38 includes a raised section 46, as shown in FIG. 4, including five open cavities $48_1 \ldots 48_5$ which fit around the capacitors $30_1 \ldots 30_5$. Behind the cavities $48_1 \ldots 48_5$ are five smaller cavities $50_1 \ldots 50_5$ formed in a relatively thinner portion 52 which surround and protect the fuses $32_1 \ldots 32_5$.

Figure 5A:
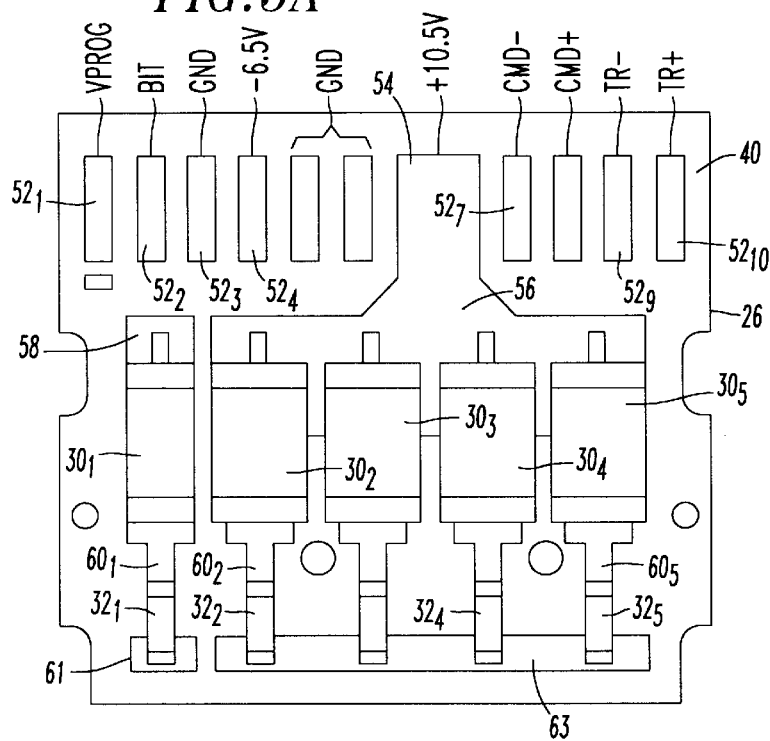
FIGS. 5A, 5B, 5C and 5D disclose top, side and bottom plan views and an electrical schematic diagram of the circuit board assembly of the capacitor bank shown in FIG. 4.
Figure 5B:
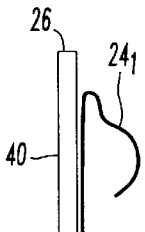
Figure 5C:
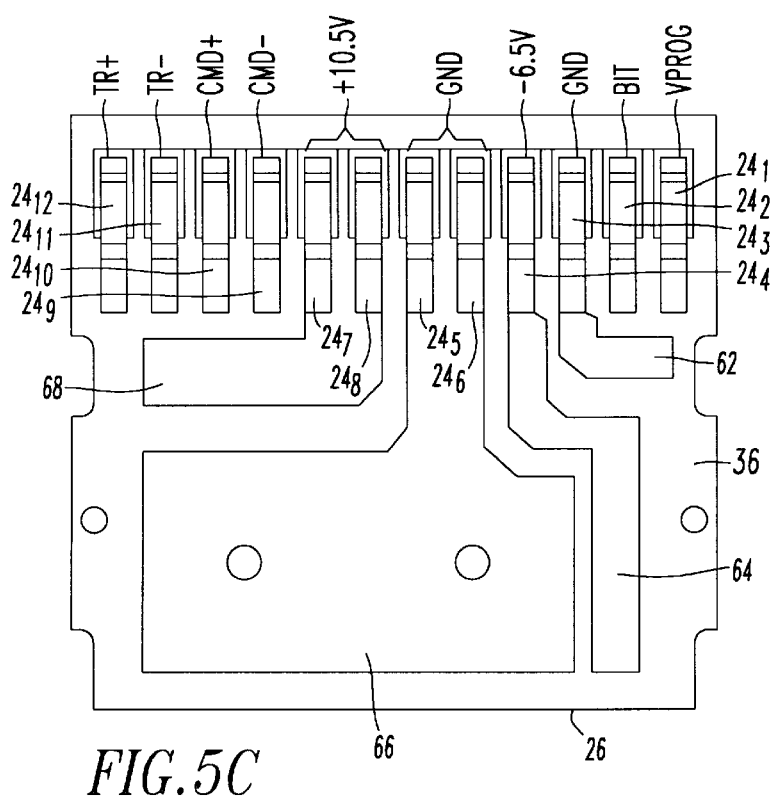
Figure 5D:
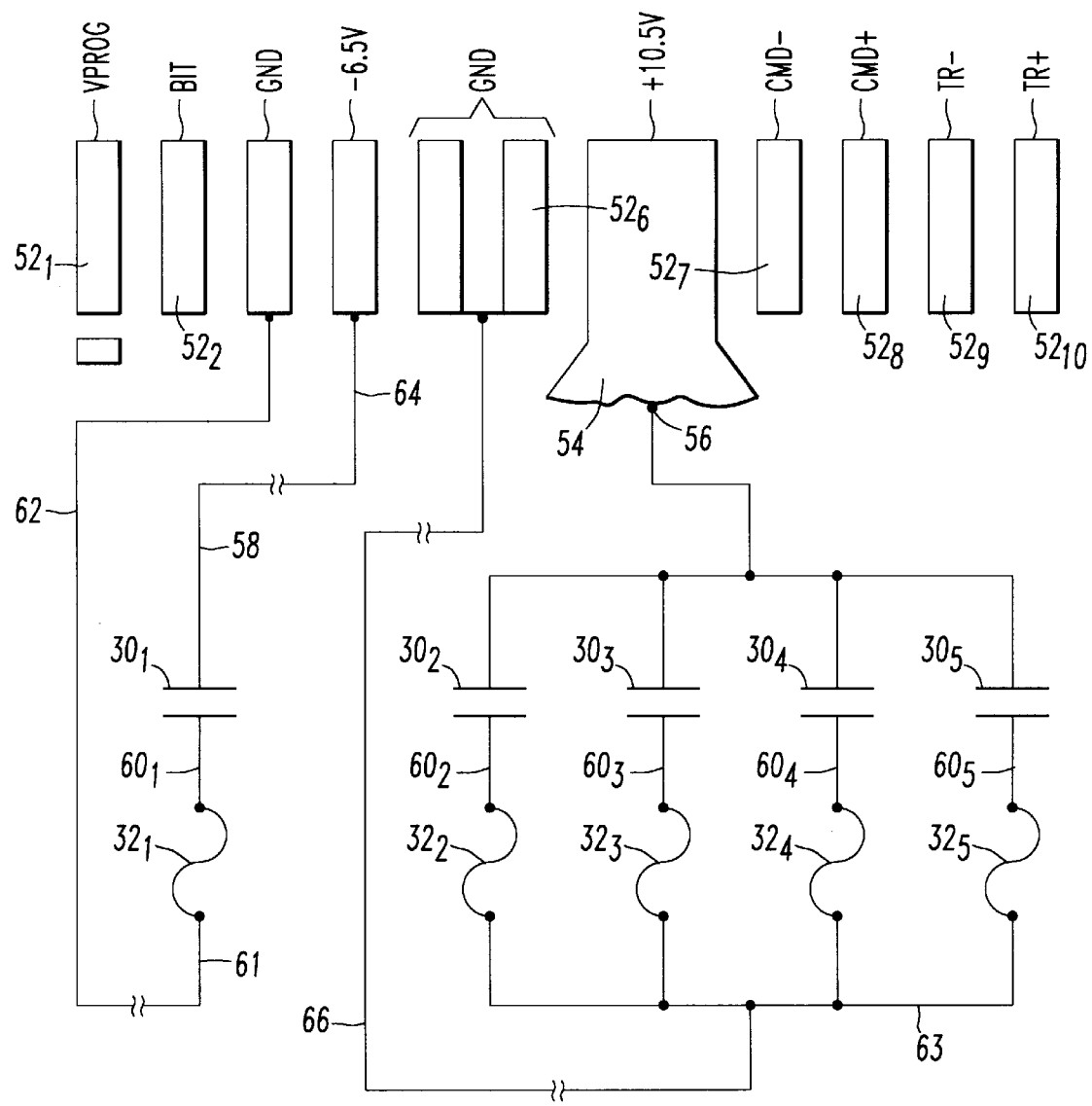

Both the top and bottom surfaces 40 and 36 of the circuit board 26 include patterns of metallization in the form of conductor elements as shown in FIGS. 5A and 5C for implementing the DC/logic interface. With respect to the conductor pattern on the top surface 40 as shown in FIG. 5A, there are ten equal sized relatively small rectangular conductors $52_1$, $52_2$, ... $52_{10}$ and one double width conductor 54. The conductor element 54 widens out to a larger section of metallization 56 which extends beneath the four larger capacitors $30_2$ ... $30_5$. One side of these capacitors are commonly connected to the area of metallization 56. A relatively small rectangular area of metallization 58 extends partially under the front end of the smaller capacitor $30_1$ and is connected thereto. The other end of capacitors $30_1$ ... $30_5$ respectively terminate at five like areas of metallization $60_1$, $60_2$ ... $60_5$ and connect one side of the capacitors $30_1$ ... $30_5$ to an adjacent end of the respective fuses $32_1$, ... $32_5$. The opposite end of fuse $32_1$ for the smaller capacitor $30_1$ connects a small area of metallization 61 which includes a connecting via through the back surface 36 of the board 26. The opposite ends of fuses $32_2$ ... $32_5$ connect to a common area of metallization 63 which also includes connecting vias to the back surface 36 of the circuit board 26 (FIG. 5C).

Referring now to the back surface 36 of the circuit board 26, the twelve metal spring finger connector elements $24_1$, $24_2$, ... $24_{12}$ are in registration with the top conductor elements $52_1$, ... $52_{10}$ and 54 and are mutually connected by electrical vias, not shown, through the board 26. Four areas of metallization 62, 64, 66 and 68 are additionally formed on the back surface 36 with the area of metallization 62 being connected to finger connector element $24_3$, the area of metallization 64 being connected to connector element $24_4$, the area of metallization 66 being commonly connected to a first pair of adjacent connector elements $24_5$ and $26_6$ while the area of metallization 66 is commonly connected to a second pair of connector elements $24_7$, $24_8$.

The T/R module 10 operates with two power supply potentials from respective external DC sources, not shown, namely a positive power supply voltage (+10.5 VDC) and a negative power supply potential (−6.5 VDC). The −6.5 volt negative supply voltage is connected to the module by way of finger element $24_4$ and has a ground return by way of finger element $24_3$. Respective connections thereof are made to the upper surface conductor element $52_4$ and $52_3$ of FIG. 5A by vias, not shown, through the board 26. The two areas of metallization 62 and 64 couple across the series connection of the smaller capacitor $30_1$ and its associated fuse $32_2$ by way of upper surface conductor elements 58 and 61.

The positive +10.5 volt supply voltage is commonly connected to connector fingers elements $24_7$ and $24_8$ where it is then applied to the upper conductor elements 54 and 56, which is common to one side of four parallely connected capacitors $30_2$, $30_3$, $30_4$ and $30_5$. A +10.5 volt ground return is provided from fingers $24_5$ and $24_6$ to the relatively large area of metallization 66 which connects back to conductor element 63 on the front surface 40 (FIG. 5A). This circuit configuration is further shown schematically in FIG. 5D. The remaining fingers $24_1$, $24_2$ and $24_9$ ... $24_{12}$ are utilized for logic input/output signals for the module as shown, for example, comprising the control signals VPROG, BIT, CMD−, CMD+, TR− and TR+.

When placed against the substrate 12, the conductor elements $52_1$, ... $52_6$, 54, $52_7$ ... $52_{10}$ contact complementary opposing contact segments $55_1$, ... $55_{10}$ on the substrate as shown, for example, in FIGS. 7C and 12C.

Figure 6:
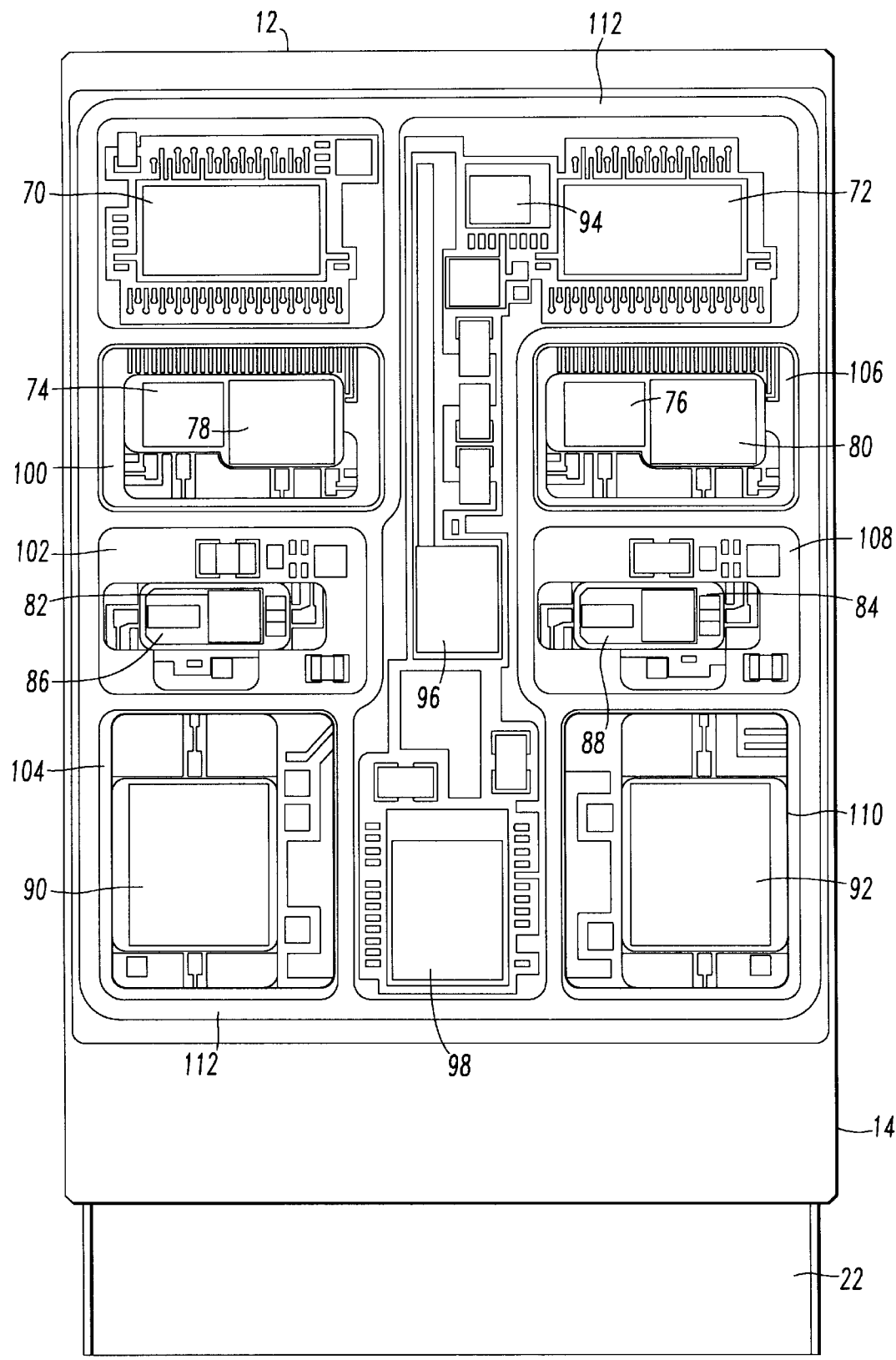
FIG. 6 is a top plan view of the interior of the T/R module package shown in FIG. 1, and populated with components of each functional sub-system located therein.

Considering now the structural details of the package of the T/R module, FIG. 6 is generally illustrative of a structure that is referred to as a TWIN PAK™ because it is populated with two sets of semiconductor integrated circuit chips including, among other things, monolithic microwave integrated circuits (MMICs) and application specific integrated circuits (ASICs) for implementing two separate and independent T/R channels. While two T/R channels are contemplated for the preferred embodiment of this invention, it is conceivable that more than two channels could be implemented, if need be, with a more innovative design.

Nevertheless, each of the two channels of the subject invention respectively include: a module controller 70, 72; a switch/phase shifter 74, 76; a pre or post amp/attenuator/switch/driver amplifier 78, 80; a low noise amplifier 82, 84; a receiver protector 86 and 88 and a power amplifier 90 and 92. Located between these elements are a shared gate regulator 94, a POWERFET switch 96, and power controller 98. These elements, moreover, are shown in the block diagram of FIG. 16 and will be considered in greater detail hereinafter.

The substrate 12, as further shown in FIGS. 7B and 12B, includes six multi-level cavities, three of which, as shown by reference numerals 100, 102 and 104, are located along one side edge of the substrate 12 and are used in connection with one of the T/R channels, while the other three cavities 106, 108 and 110 comprise like multi-level cavities along the other side edge of the substrate 12 and used in connection with the other T/R channel.

The cavities 100 ... 110 are, moreover, shown in the sectional views 8, 9, 10 and 13. With the exception of the forward cavities 104 and 110 in which is respectively located only in the power amplifier 90 and 92, the other cavities 100, 102 and 106, 108 include two or more integrated circuit components therein as shown in FIG. 6. Such an arrangement results in separate isolated cavities for the RF gain stages in the input and output of the transmit circuitry. For example, the two rear cavities 100 and 106 share respective switch/phase shifter MMICs 74, 76 and post-amp/attenuator/switch/driver amplifiers MMICs 78, 80. The intermediate cavities 102 and 108 respectively include low noise amplifiers (LNA) 82, 84 and receiver protectors 86, 88. With respect to the module controllers 70 and 72, they do not reside in cavities, but are located on a top HTCC layer of the substrate 12.

Figure 14:
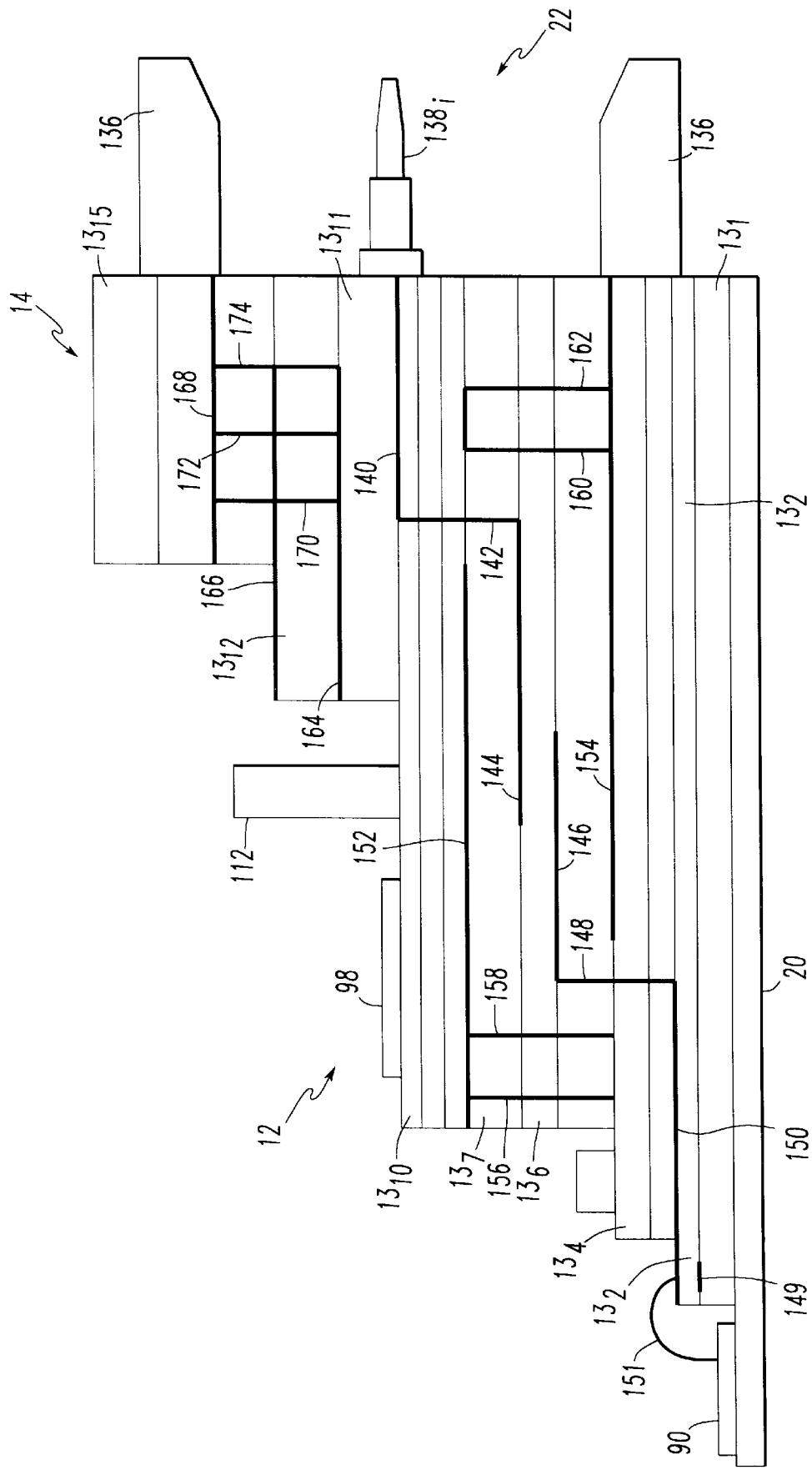
FIG. 14 is a diagram further illustrative of the HTCC ceramic layers at the front portion of the package along with patterns of ground and signal vias forming an RF transition between certain layers.

The two module controllers 70 and 72, the gate regulator 94 and power controller 98 are comprised of ASICs, while the phase shifter/switches 74, 76; the post amplifier/attenuator/switch/driver elements 78, 80; the low noise amplifiers 82, 84, and the two output power amplifiers 90, 92 comprise MMICs which reside in the cavities 100, 102, 104, 106, 108 and 110, and which are placed in direct contact with and bonded to the heat sink plate 20 as shown, for example, in FIG. 14. While the heat sink plate 20 is preferably comprised of a copper tungsten alloy to enhance heat dissipation of the heat generated by the MMICs through the plate 20 to an external heat exchanger, not shown, other heat conducting metallic materials can also be used when desired, such as copper molybdenum or aluminum silicon carbide.

Figure 13:
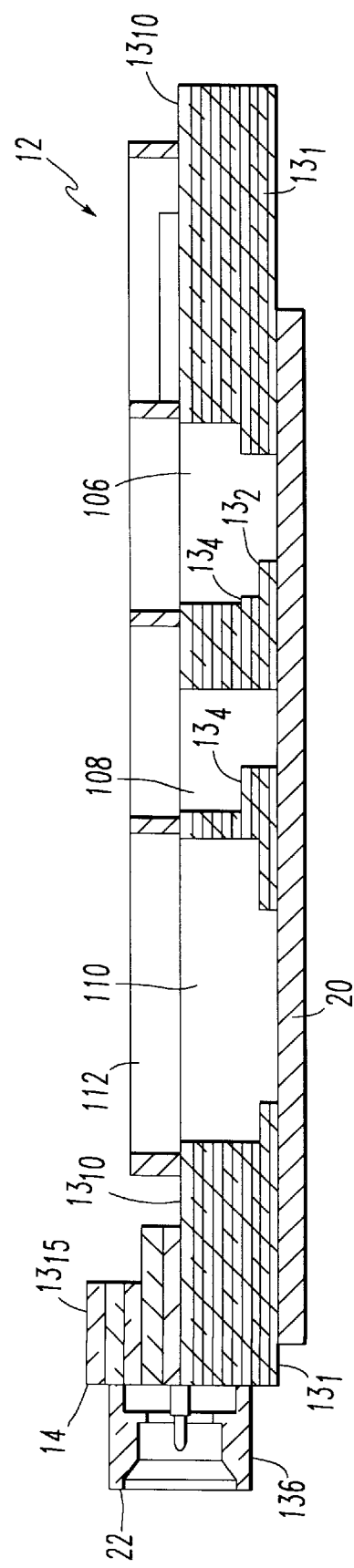
FIG. 13 is a cross-sectional view of the T/R module package shown in FIG. 12B, taken along the lines 13—13 thereof.

A metal ring frame as shown by reference numeral 112 is brazed on the top of the substrate 12 as shown, for example, in FIGS. 6 and 13 and is configured to border a major portion of the substrate 12 behind the front end portion 14 so as to encircle the six cavities 100, 102 ... 110 as well as the regions including the module controllers 70 and 72 and the shared circuit components 94, 96 and 98 residing in the center of the substrate on either side of the T/R channels. Its purpose is to receive and support the flat cover member 18 shown in FIGS. 1 and 2A and provide isolation and RF shielding from respective elements.

FIGS. 7A–7D are intended to illustrate the construction of the substrate 12 in its unpopulated state, and without an RF connector 22 assembly and heat sink plate 20. FIGS. 12A–12D, on the other hand, are intended to show the same unpopulated structure of the substrate 12, but now also including the heat sink plate 20 and the RF connector assembly 22. The stippling is intended to denote surfaces which include areas of exposed metallization, e.g. gold.

FIG. 7C is illustrative of the exposed bottom surface 114 of the substrate 12 and includes openings therein 116, 118 . . . 126 and which correspond to the shape of the cavities 100, 102 . . . 110 shown in FIG. 7B looking from the top. The surface 114, moreover, comprises the lowermost surface of the lowermost layer $13_1$ of a plurality of stacked HTCC layers $13_1$ . . . $13_{15}$ shown in FIGS. 8–11, 13 and 14. The metallization pattern comprises a ground plane of metallization 128 including the two input conductor segments $55_3$ and $55_5$ and the isolated input/output conductor segments $55_1$, $55_2$, $55_4$, $55_6$ . . . $55_{10}$ which mate with the conductor segments $52_1$ . . . $52_6$, 54, $52_7$ . . . $52_{10}$ of the capacitor bank connector plate 26 as shown, for example, in FIG. 5A. It can be seen that conductor segment $55_3$ of FIG. 7C and segment $52_3$ of FIG. 5A form a common ground connection along with segment $55_5$ of FIG. 7C and segments $52_5$, $52_6$ of FIG. 5A.

Figure 7D:
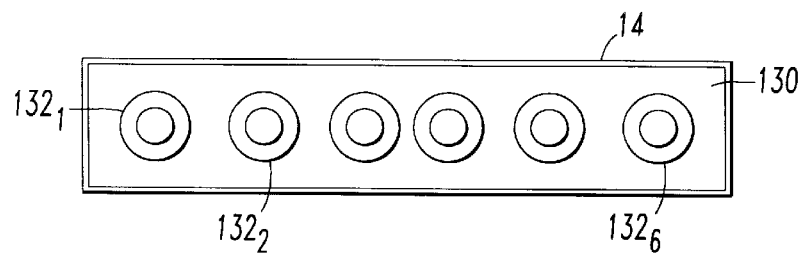
Figure 8:
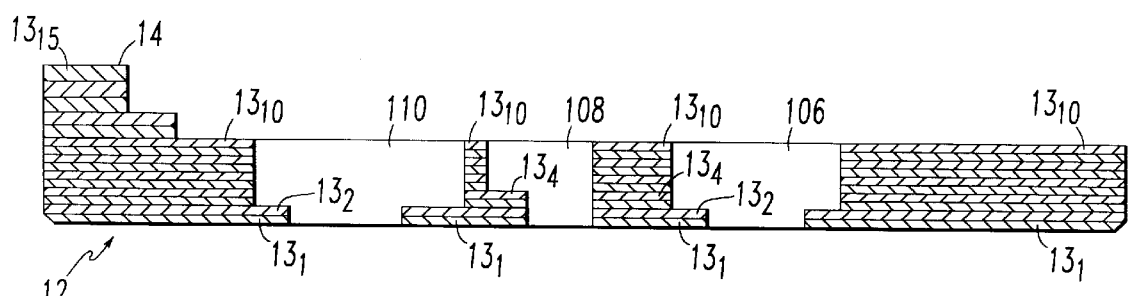
FIG. 8 is a cross-sectional view of the T/R module package shown in FIG. 7B, taken along the lines 8—8 thereof.
Figure 9:
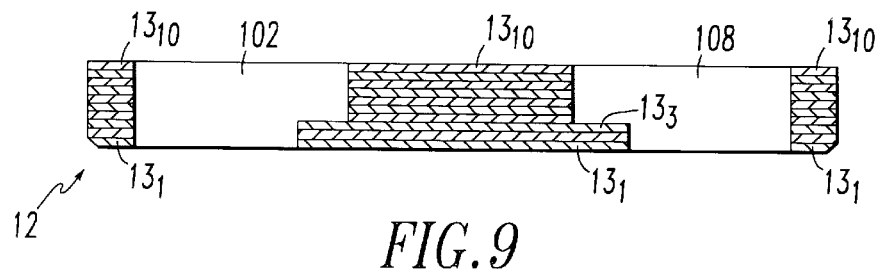
FIG. 9 is a cross-sectional view of the T/R module package shown in FIG. 7B, taken along the lines 9—9 thereof.
Figure 10:
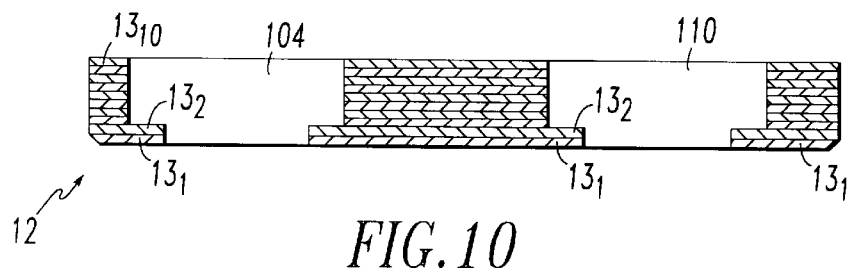
FIG. 10 is a cross-sectional view of the T/R module package shown in FIG. 7B, taken along the lines 10—10 thereof.

FIG. 7D shows the face 130 of the front end portion 14 of the substrate 12 including six(6) isolated circular segments of metallization $132_1$, $132_2$ . . . $132_6$ which define the pin location of six(6) aligned blind mate press on connectors $134_1$, $134_2$ . . . $134_6$, included in the connector assembly 22, as further shown in FIG. 12D, and enclosed in an elongated generally rectangular shroud 136.

The connector assembly 22 results in an in-line connector assembly including two separate transmit(Tx) connectors $134_2$ and $134_6$, two separate receive (Rx) connectors $134_1$ and $134_5$ for individual connection to antenna elements of an array, but only two manifold connectors $134_3$ and $134_4$ which share connection to a transmit and receive manifold and which allows the module 10 to be easily plugged into the array during assembly and thereafter removed when required.

It can be seen with reference to FIG. 12B that the inner surface of the heat sink plate 20 also includes metallization which covers the cavity openings 116, 118 . . . 126 of FIG. 7C. It is this surface on which all of the heat generating MMICs located in the six cavities 100, 102 . . . 110 are mounted.

Figure 11:
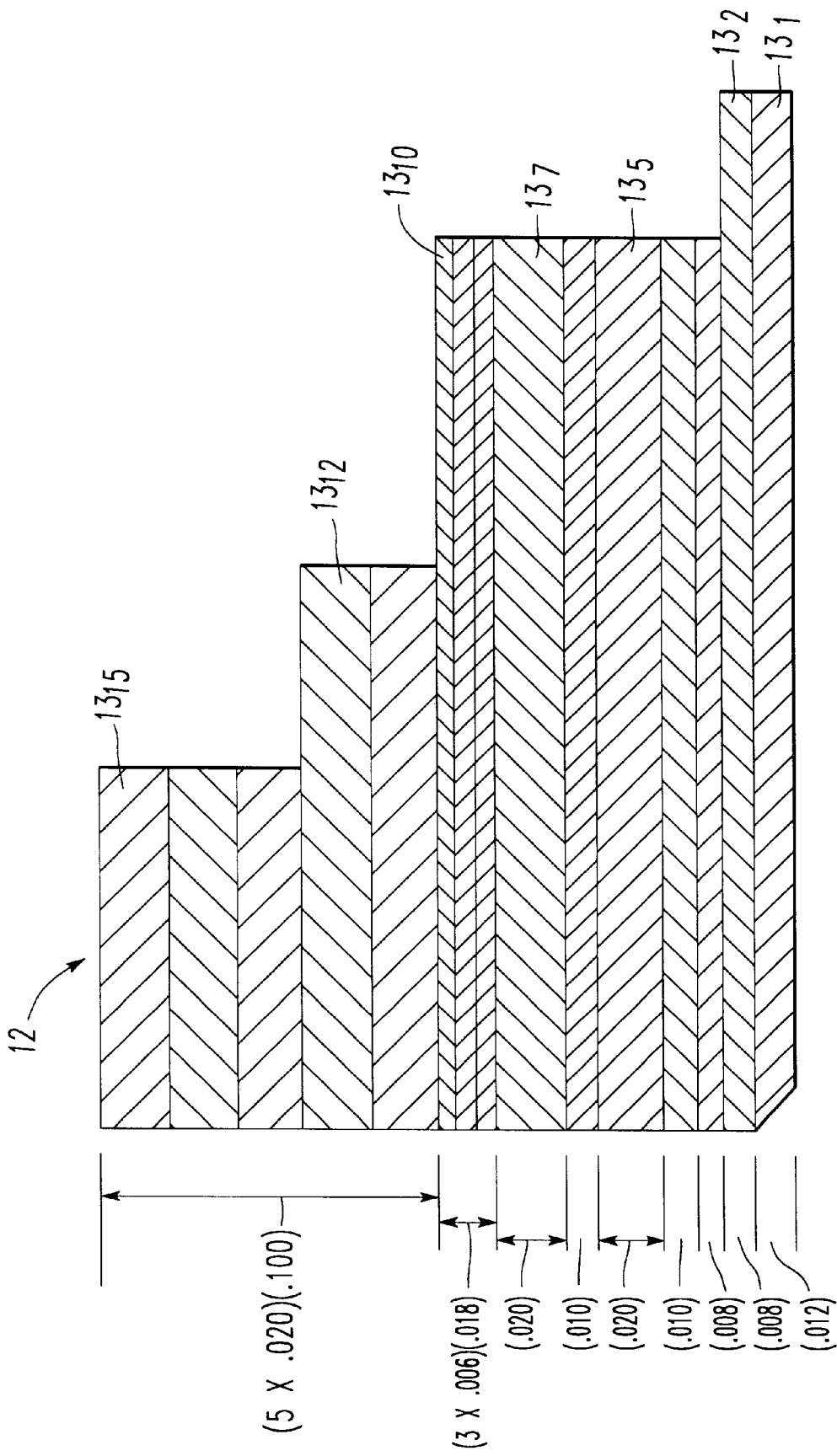
FIG. 11 is an enlarged view of the left side portion of the cross section shown in FIG. 8, and being further illustrative of the stack-up of the various HTCC ceramic layers located at the front portion of the T/R module package shown in FIG. 7B.

Referring now to the cross-sectional views of FIGS. 8–11 and FIGS. 13, 14, shown thereat is the multi-level, configuration of the high temperature co-fired ceramic (HTCC) substrate 12. As shown in FIG. 11, for example, the substrate 12 is comprised of fifteen contiguous layers $13_1$, $13_2$ . . . $13_{15}$ of HTTC material, ranging in thickness between 0.006 in. to 0.020 in. and wherein layers $13_1$ through $13_{10}$ are used to form the six cavities 100, 102, 104, 106, 108 and 110.

The multi-level structure of the substrate 12 as shown in FIG. 14 permit passive components to be located within the cavities on layer or steps 134, for example, and for implementing wire bond connections between chips at layer $13_2$ and for providing connections to the MMICs located on the heat sink plate 20. In FIG. 14, reference numeral 90 represents the RF power output amplifier MMIC 90 located in cavity 104. The layer $13_{10}$ comprises a layer upon which the power controller ASIC 98 is located. Also layer $13_{10}$ is the layer upon which the ring frame 112 member (FIG. 13) and connector pins $138_1$ . . . $138_6$ of a blind mate press-on connector assembly 22 are brazed. The connector pins $138_1$ . . . $138_6$ comprise elements which are manufactured and supplied by Gilbert Engineering, Inc. of Phoenix, Ariz. in forming what is referred to as a Gilbert press-on or "GPPO" connector. The five uppermost layers $13_{11}$ . . . $13_{15}$ is shown at the right on FIG. 14, comprise what is referred to as "dummy" layers and form the forward portion 14 of the substrate 12.

The substrate layers $13_1$ . . . $13_{10}$ provide the ability to implement 3-D routing of both RF signals and DC signals within the substrate 12 as well as embedding a pair of RF manifold couplers therein. RF routing and transitions comprise coupling the inputs and outputs from the six pin connector assembly 22 and implementing a well matched structure up to all the MMICs located in the cavities 100 . . . 110. Shielded 3-D routing is implemented within the substrate 12 and results from the layers $13_1$ . . . $13_{10}$ being comprised of contiguous discrete dielectric layers, each with its own pattern of ground plane and vertical feed-throughs or vias, along with respective stripline conductor patterns formed on the top surface thereof as will be shown hereinafter. RF signals enter and leave the module 10 by means of the connector assembly 22.

Connector assembly 22 includes six like RF coaxial connectors $134_1$ . . . $134_6$, including pins $138_1$ . . . $138_6$, arranged in linearly (FIG. 12D) within and across the shroud member 136. In FIG. 14, the connector pin 138i is shown connected to a stripline conductor 140 on the top of the HTCC layer $13_{10}$. Stripline conductor 140 extends inwardly where it connects to a vertical via 142 which descends to a length of stripline conductor 144 on the top of layer $13_6$. Immediately below conductor 144 on top of layer $13_5$ is a length of stripline conductor 146 which extends under conductor 144. Such an arrangement permits RF coupling between conductors 144 and 146 and is intended to illustrate the concept of two RF manifold couplers, one of which acts as a signal splitter and one of which acts as a signal combiner, which are embedded in the substrate 12 and will be described hereinafter.

Further as shown in FIG. 14, stripline conductor 146 connects to a vertical via 148 which descends to the top of layer $13_2$ and stripline conductor 150. At the outer end of conductor 150 is a bond wire member 1S1 which connects the MMIC 90. A stripline conductor element 149 which acts as a capacitive stub is also shown located on the top of layer $13_1$ directly beneath the bond wire connection of member 151 to conductor 150. Isolation and shielding for the RF coupler configured by stripline conductors 144 and 146 are further provided by upper and lower ground planes 152 and 154 including multiple vertical vias 156, 158 and 162 terminating the top of layers $13_4$ and $13_7$, respectively.

Also, as shown in FIG. 14, the shroud 136 is coupled to three ground planes 164, 166 and 168 which are further interconnected by multiple vertical vias 170, 172 and 174. This in combination with the metal alloy plate 20, provides shielding for the signals passing to and from the RF connector assembly 22.

Achieved thereby is an RF structure including a connector to stripline section, a stripline to stripline section, a coupler section and a stripline to MMIC section.

Minimal RF output routing is obtained by the configuration of the invention shown in FIG. 14. The benefit obtained results from the fact that about 1 to 2 dB of losses can be produced by each inch of RF routing from a power amplifier to the RF interface through one or more module layers. Such a loss would drop the output RF power from 100% nominal to about 80% with use of alumina ceramic dielectric as substrate and layer material, or to about 63% with use of common black ceramic.

Referring now to FIGS. 17A, 17B, 17C through 26A and 26B, wherein like reference numerals refer to common elements, shown thereat are the vertical vias formed through each of the dielectric HTCC layers $13_1 \ldots 13_{10}$ and the respective stripline conductor metallization patterns formed on the top surfaces thereof.

Figure 17A:
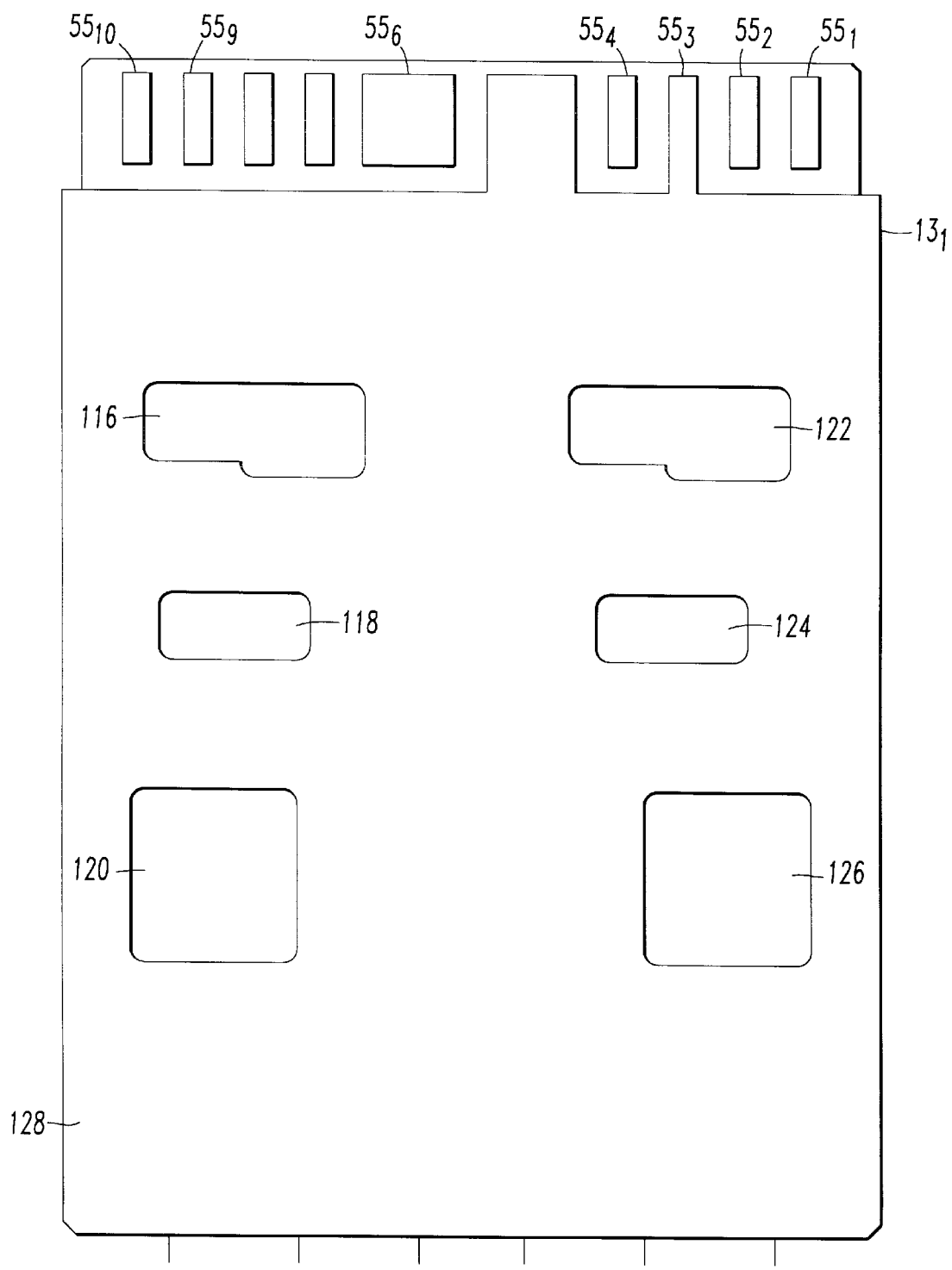
FIGS. 17A–17C are illustrative of the ground metallization pattern, via metallization and top metallization pattern formed in connection with HTCC layer 1 shown in FIG. 14.
Figure 17B:
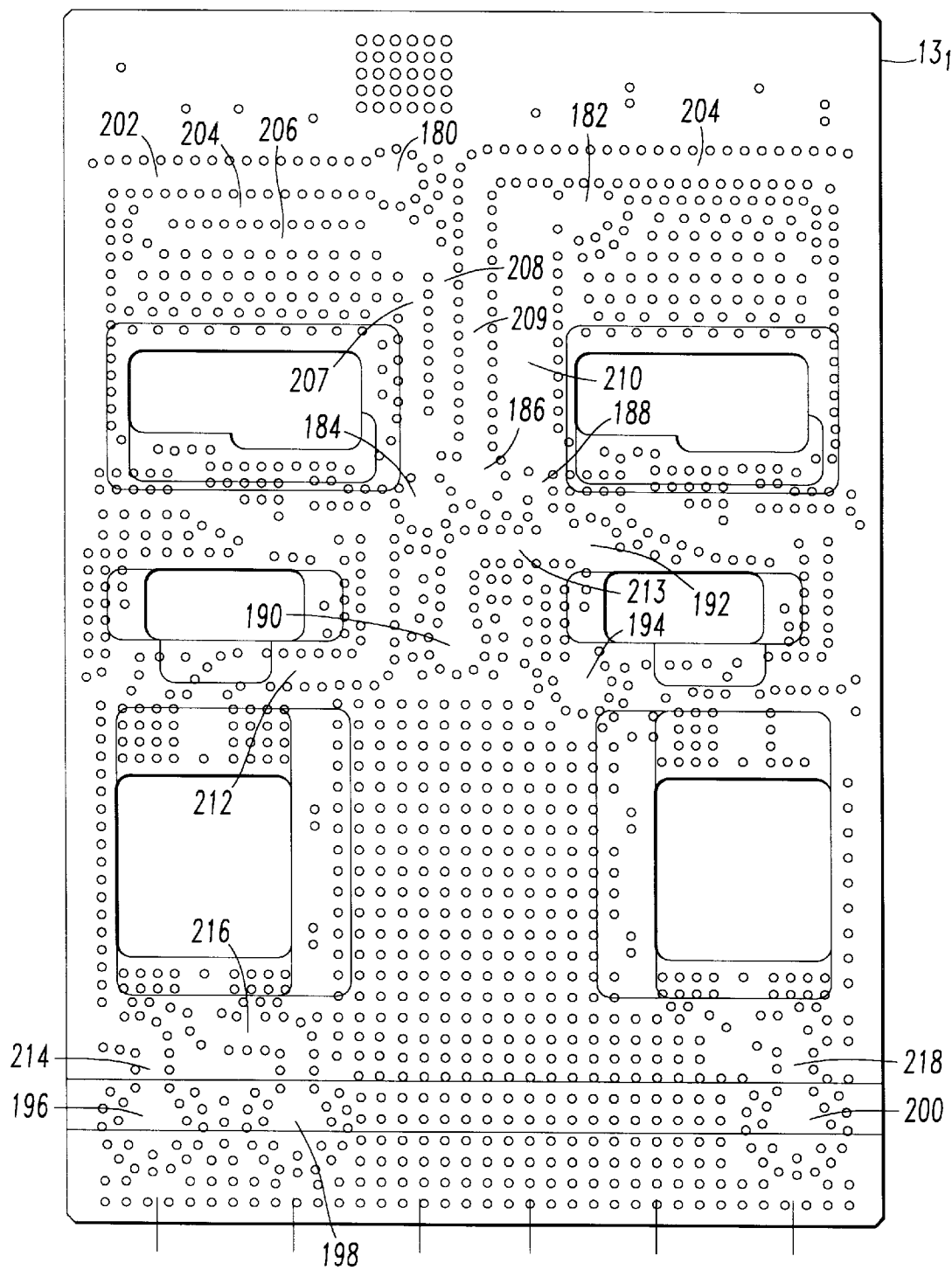
Figure 17C:
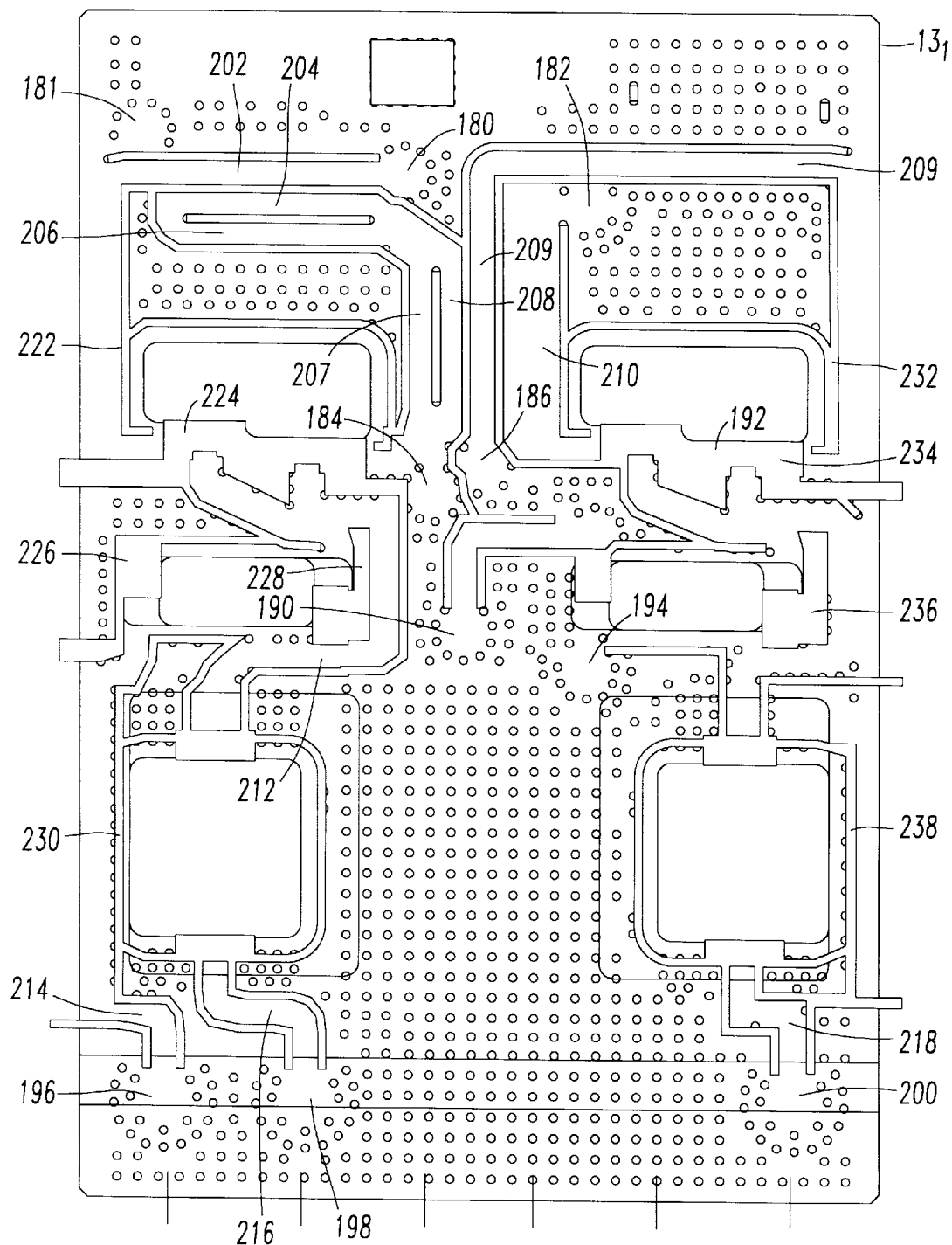

Considering first FIGS. 17A, 17B and 17C, depicted thereat is the lowermost layer $13_1$ of the substrate 12 and one which includes a ground plane 128 (FIG. 7C), the face-up side of which is shown in FIG. 17A along with the DC logic conductor interface elements $55_1 \ldots 55_{10}$. Generally rectangular unmetallized areas 116 . . . 126 which define openings for the six cavities 100, 102 . . . 110 are also shown in FIG. 17A. This same pattern of openings also exists in the upper HTTC layers $13_2 \ldots 13_{10}$.

FIG. 17B discloses the pattern of vias fabricated vertically through HTCC layer $13_1$. The circular via patterns 180, 182, 184 . . . 198, 200 are illustrative of a plurality of cylindrical vertical via patterns which can be seen in combination with the upper ceramic layers $13_2$ and $13_3$ such as FIGS. 18A and 19B to form cylinder-like shielded conduits for RF signal carrying vias centralized in the circular patterns of vias and transitioning vertically between layers. Pairs of mutually parallel lines of vias 202, 204 . . . 216, 218 represent shielding type passageways for signal carrying stripline conductors located in layer 132 (FIGS. 18A, 18B) above layer $13_1$.

The top surface of layer $13_1$ as shown in FIG. 17C includes a stripline metallization pattern which acts in concert with the underlying lines of vias 202 . . . 218 to form a bottom channelized RF shielding layer for the signal carrying conductors located above on layer $13_2$ along with stripline elements 222, 224 . . . 236, 238.

Figure 18B:
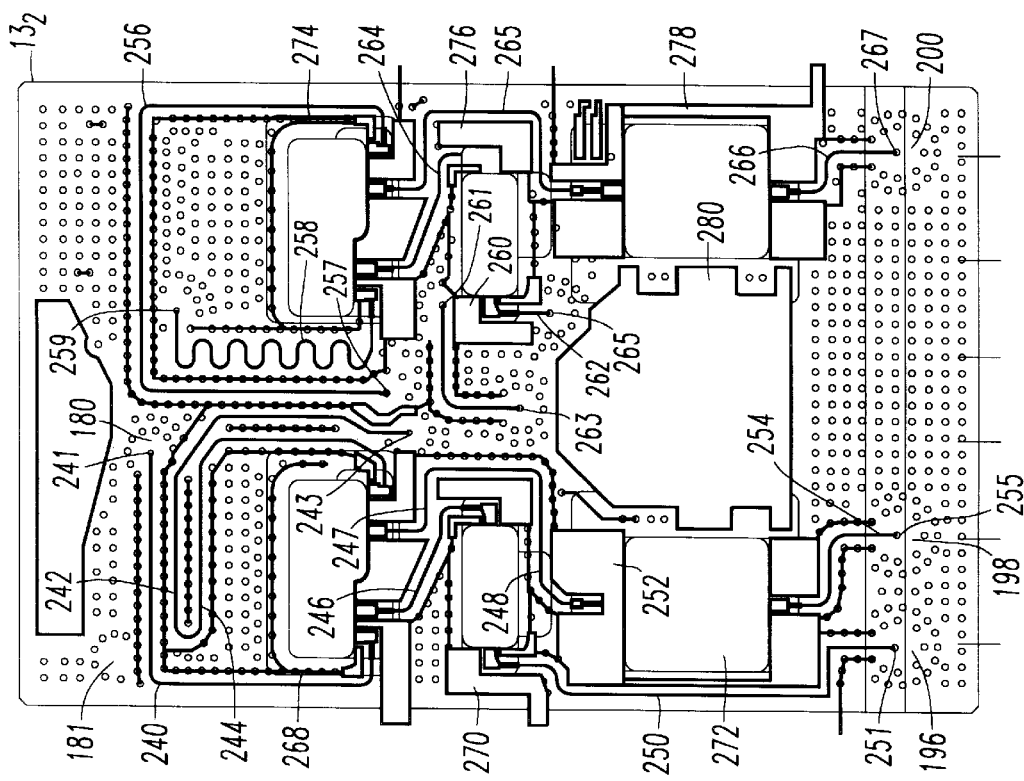
FIGS. 18A–18B are illustrative of via and top surface metallization pattern formed in connection with HTCC layer 2 shown in FIG. 14.
Figure 18A:
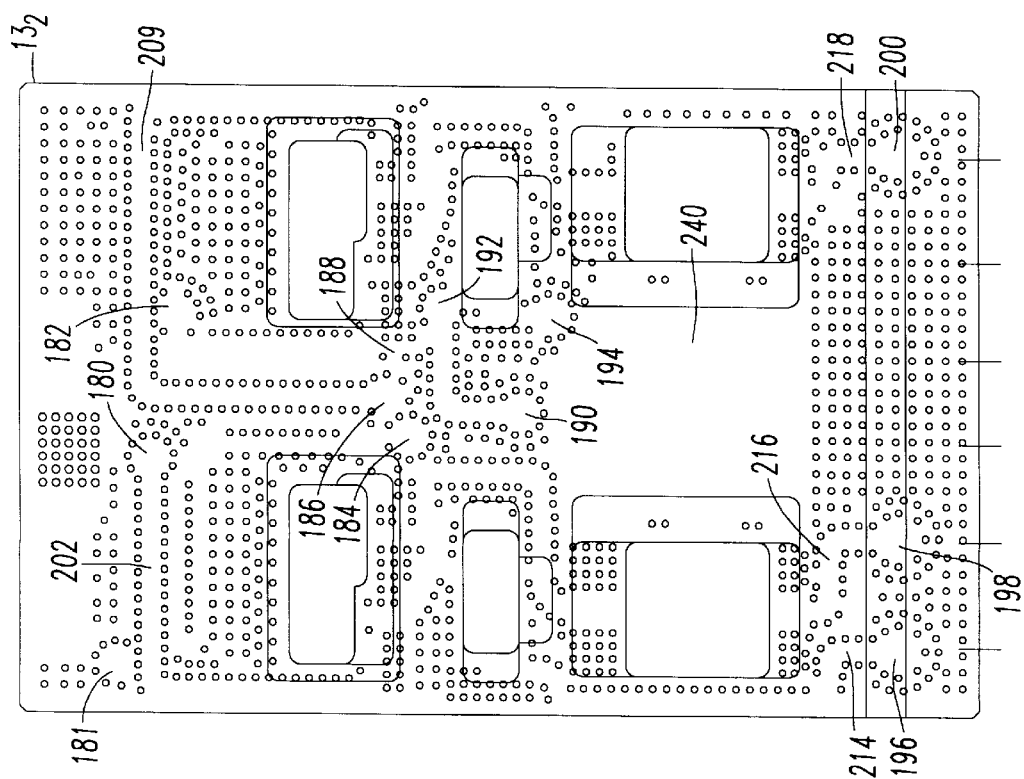

Referring now to layer 132 and FIGS. 18A and 18B, the arrangement of vertical vias shown in FIG. 18A is substantially the same as that shown in FIG. 17A, with the exception of an absence of vias at the area of reference numeral 240. The pattern of metallization of FIG. 18B matches that of FIG. 17C, but now also includes, for example, RF signal carrying stripline conductors 240, 242 . . . 264, 266, with conductors 240, 242, 250, 254, 256, 258, 260, 262, and 266 terminating in vertical vias 241, 251, 255, 257, 259, 261, 263, 365 and 267. Borders of metallization 268, 270 . . . 278, 280 surround the cavity areas 116 . . . 126 (FIG. 17A). It is important to note that the stripline conductors 250, 254 and 266 feed out to RF connectors $134_1$(RX1), $134_2$(TX1) and $134_6$(TX2) shown in FIG. 12D by means of vertical vias 251, 255 and 267.

With respect to the third layer $13_3$ shown in FIGS. 19A and 19B, its pattern of vertical vias as shown in FIG. 19A also matches the via patterns of FIGS. 17B and 18A, particularly with respect to the parallel line pairs of vias 202 . . . 218. The top surface of metallization of FIG. 19B includes substantially the same stripline pattern shown in FIG. 17C but with an extra area of metallization 281 and thus acts as a top channelized shielding layer thereby implementing a shielded outer conductor or conduit for the signal carrying conductors located in layer $13_2$.

Figure 12D:
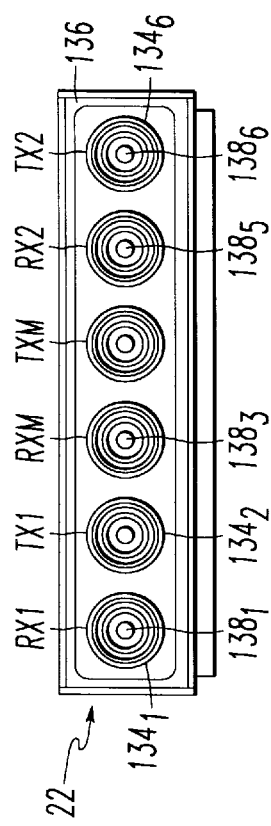

The bottom three layers $13_1$, $13_2$, and $13_3$ of HTCC material thus implement one of two levels of RF routing and one for routing RF signals between the various MMICs in the cavities 100 . . . 110 and the connector assembly 22 (FIG. 12D)

Figure 20B:
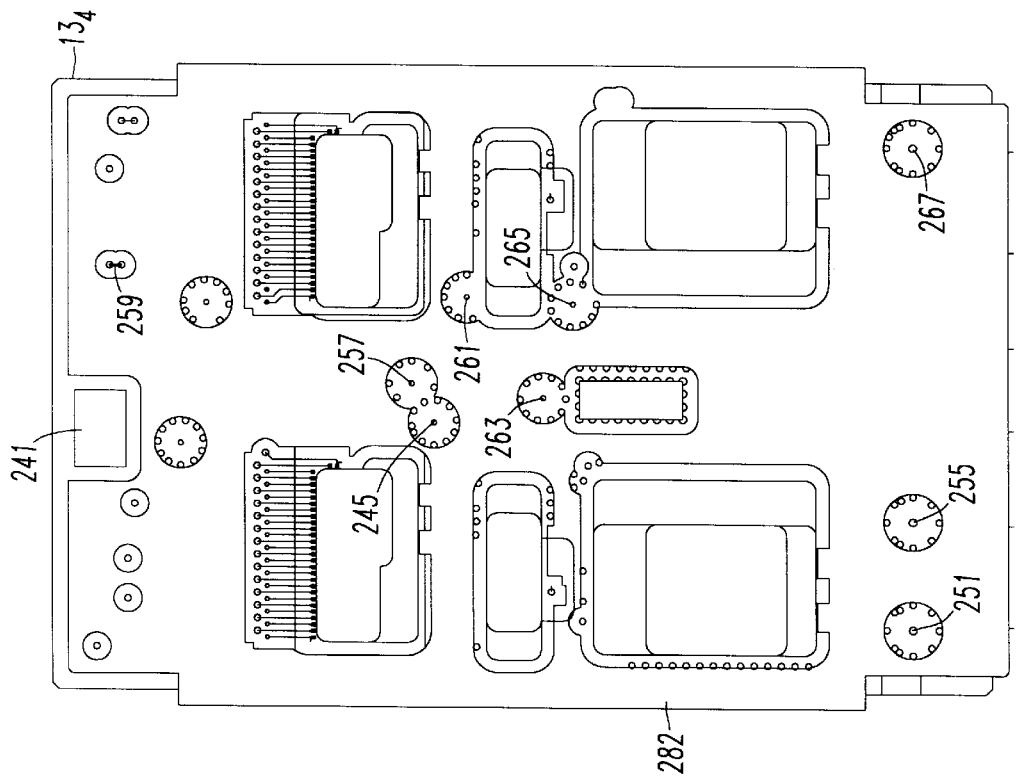
FIGS. 20A–20B are illustrative of the via and a ground metallization pattern formed in connection with HTCC layer 4 shown in FIG. 14.
Figure 20A:
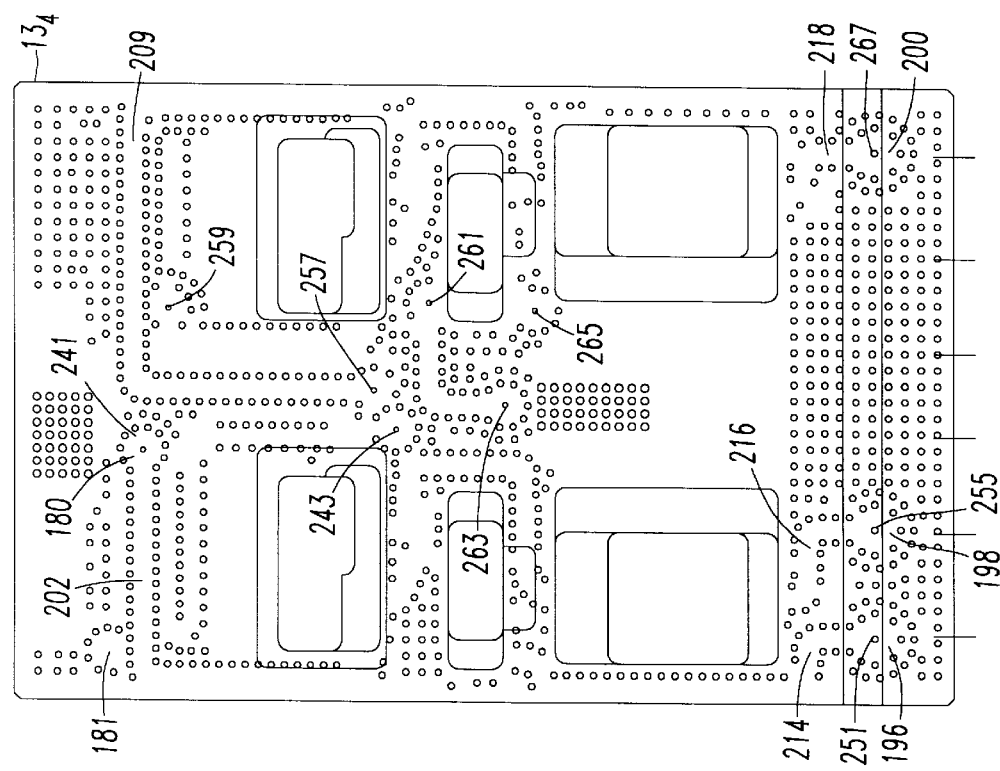

Proceeding upwards in the substrate 12, layer $13_4$ as shown in FIGS. 20A and 20B comprises an HTCC layer implementing a first internal ground plane. Its pattern of vias, as shown in FIG. 20A, substantially matches the via pattern shown in the underlying layer $13_3$ (FIG. 19A). The upper surface of layer $13_4$ (FIG. 20B) comprises a ground plane of stripline as shown by reference numeral 282, along with a plurality of circular openings within which are located vias 241, 243 . . . 267, as shown. These vias match the underlying like numbered vias in FIG. 19B.

Next, the intermediate layers $13_5$, $13_6$ and $13_7$, in addition to including specific patterns of conductors and vias, also implement a pair of RF signal couplers which connect to both T/R channels and which results in eliminating two relatively expensive GPPO manifold connectors. An example of how such a coupler is fabricated in the subject invention is shown in FIG. 14 with reference to the stripline conductors shown by reference numerals 144 and 146.

Figure 21B:
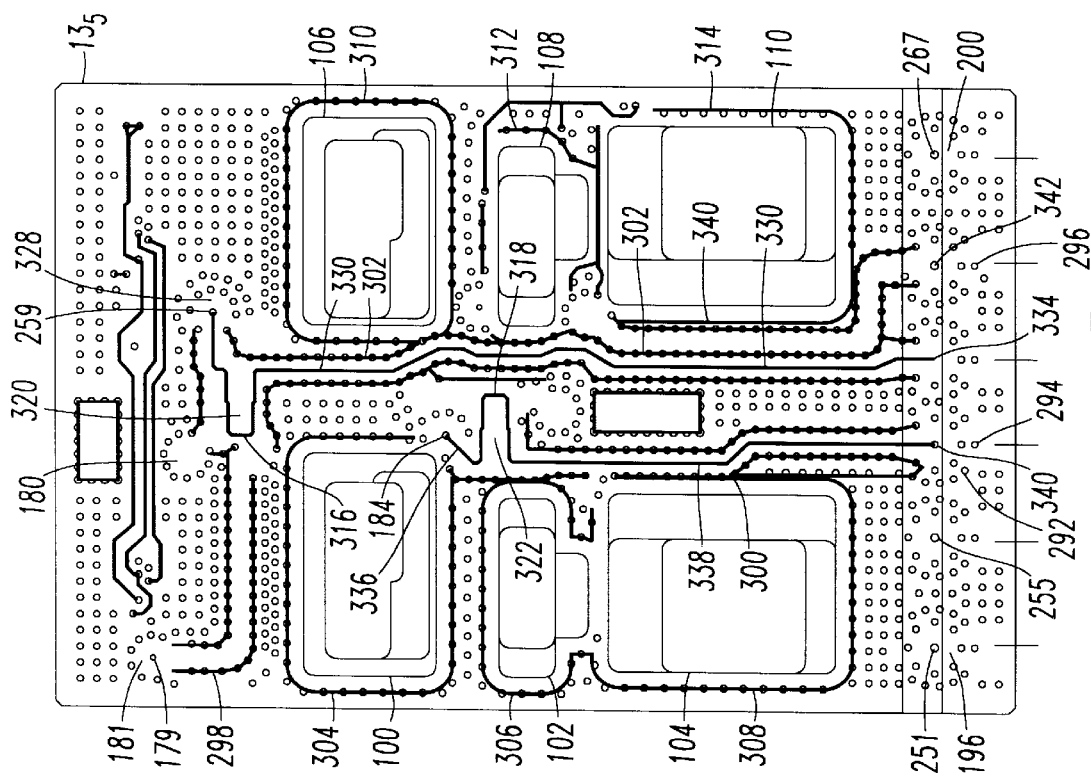
FIGS. 21A–21B are illustrative of the via and top surface metallization pattern formed in connection with HTCC layer 5 of FIG. 14.
Figure 21A:
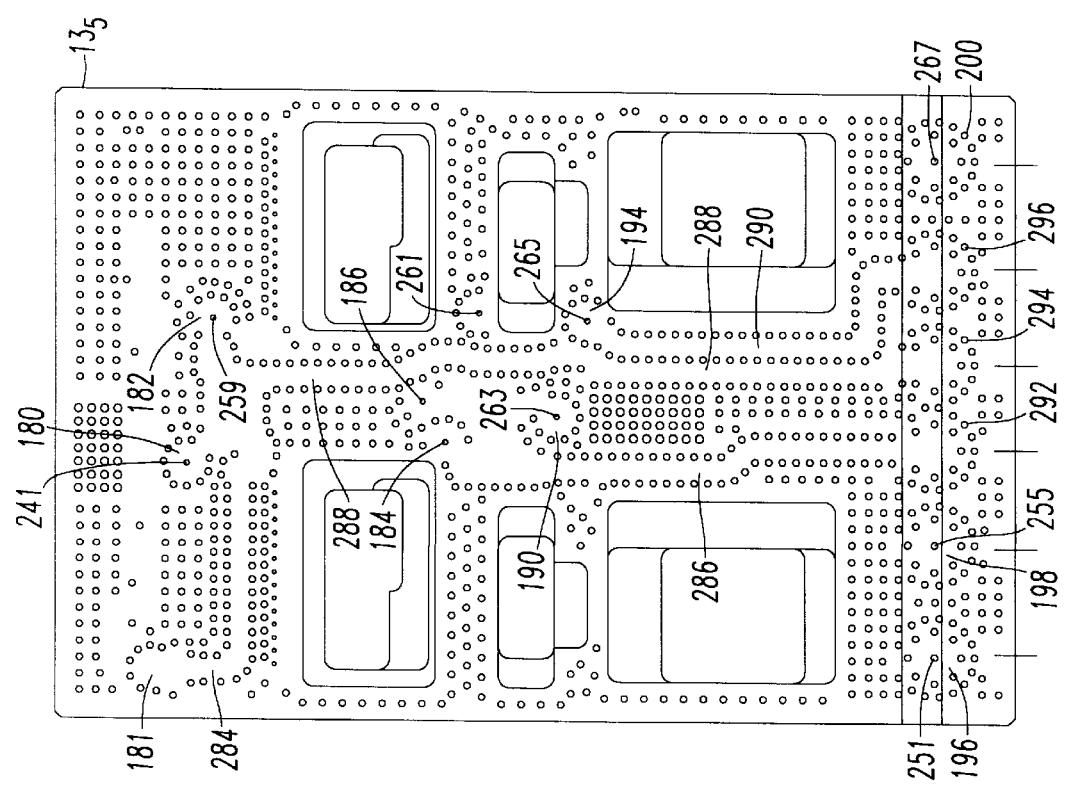

Referring now to the fifth HTCC layer $13_5$ as shown in FIGS. 21A and 21B, shown in FIG. 21A is a vertical via pattern of vias and stripline which also includes, inter alia, the circular via patterns 180, 181, 182 . . . 198, 200, but also now includes new parallel line pairs of vias 284, 286, 288, and 290, with pairs 286, 288 and 290 terminating in respective additionally circular via patterns 292, 294 and 296 located at the RF connector end of the substrate.

With respect to the metallization pattern on the top surface of layer 135 as shown in FIG. 21B, it includes pairs of parallel stripline shield conductors 298, 300 and 302 over the parallel lines of vias 284, 286 and 288 shown in FIG. 21A. Also, shielding striplines 304, 306 . . . 312, 314 are again formed around the openings for the cavities 102, 104 . . . 110.

Figure 22B:
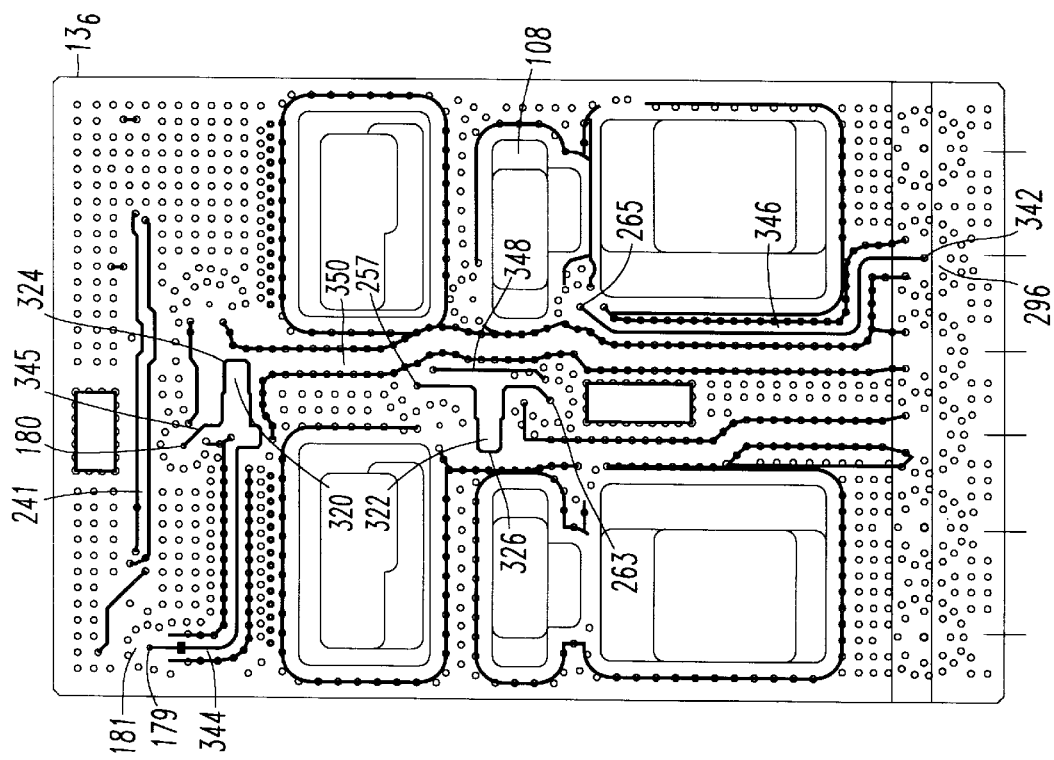
FIGS. 22A–22B are illustrative of the via and top surface metallization pattern formed in connection with HTCC layer 6 shown in FIG. 14.

Centrally located on layer $13_5$ are two underlying stripline segments 316 and 318 of two RF signal couplers, one a transmit manifold coupler 320 which acts as an RF signal splitter, and the other a receive manifold coupler 322, which acts as an RF signal combiner, and whose respective overlaying stripline segments are shown by reference numerals 324 and 326 in FIG. 22B (layer $13_6$). One side of transmit manifold coupler segment 316 is connected to conductor 328 and via 259 while the opposite side connects to an elongated conductor 330 which passes through conductor pair 302 to a vertical via 334 in the circular via pattern 294 and which connects to RF connectors $134_4$ (FIG. 12D).

One side of receive manifold coupler segment 322 connects to conductor 336 and via 184 while the opposite side thereof connects to an elongated conductor 338 which passes through conductor pair 300 to a vertical via 340 in circular via pattern 292 and which then connects to RF connector $134_3$ in FIG. 12D. FIG. 21B also depicts a shield conductor pair 341 which mutually shares a conductor with adjacent shield conductor pair 302. A vertical via 342 is also now provided in circular via pattern 296.

Figure 22A:
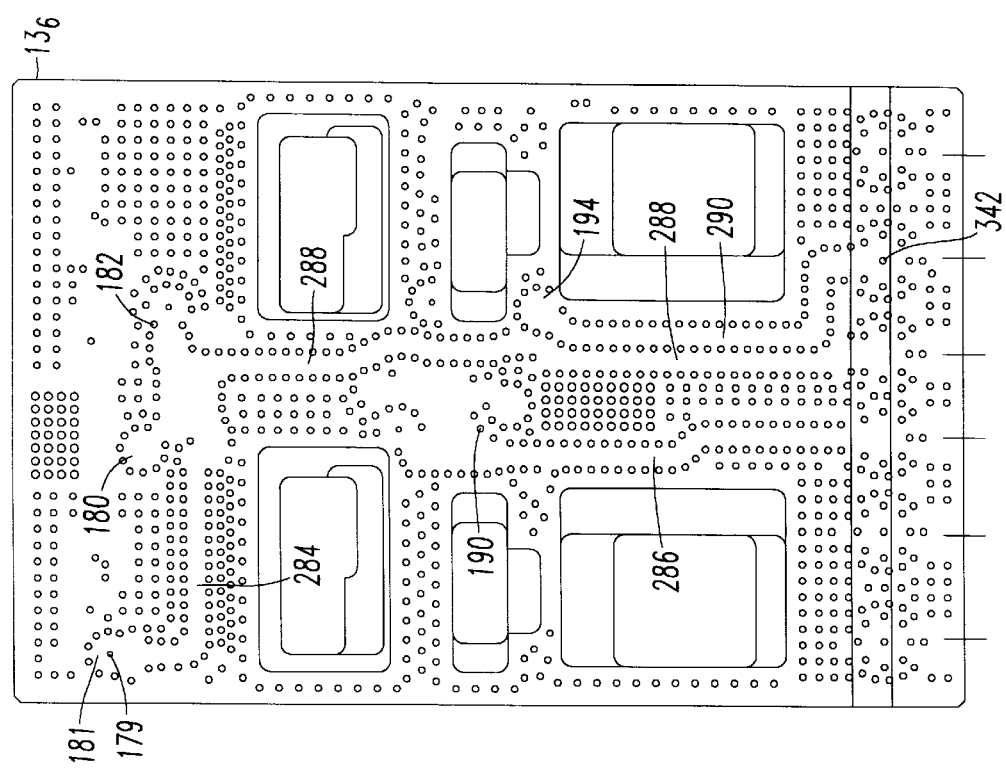

Considering now layer $13_6$, the via pattern of layer $13_6$ illustrated in FIG. 22A is similar to that in the underlying layer $13_5$ shown in FIG. 21A. The stripline conductor patterns on the top surface of the layer $13_6$ again operate as shielding elements for implementing shielding enclosures for the underlying RF conductors 300 and 330 shown in FIG. 21B as well as an RF conductor line 344 connected between via 179 and one side of transmit manifold coupler segment 324. Now an RF conductor line 346 for the received signal (RX2) of the second T/R channel is connected between via 265 and vertical via 342 in circular via pattern 296 at the RF connector end of the substrate 12. Further as shown in FIG. 22B, one side of receive manifold coupler segment 322 connects to conductor 348 and via 257 while the other side connects to conductor 350 and via 263.

Thus layers $13_5$ and $13_6$ which overlay the ground plane metallization 282 of layer $13_4$ as shown in FIG. 20B comprise a second level of RF routing which is primarily used for routing RF signals to and from the manifold couplers 320 and 322; however, as noted above, layer $13_6$ also routs the RF receive signal from the antenna array and connector assembly 22 (FIG. 12D) to the low noise amplifier 84 located in cavity 108.

Figure 23B:
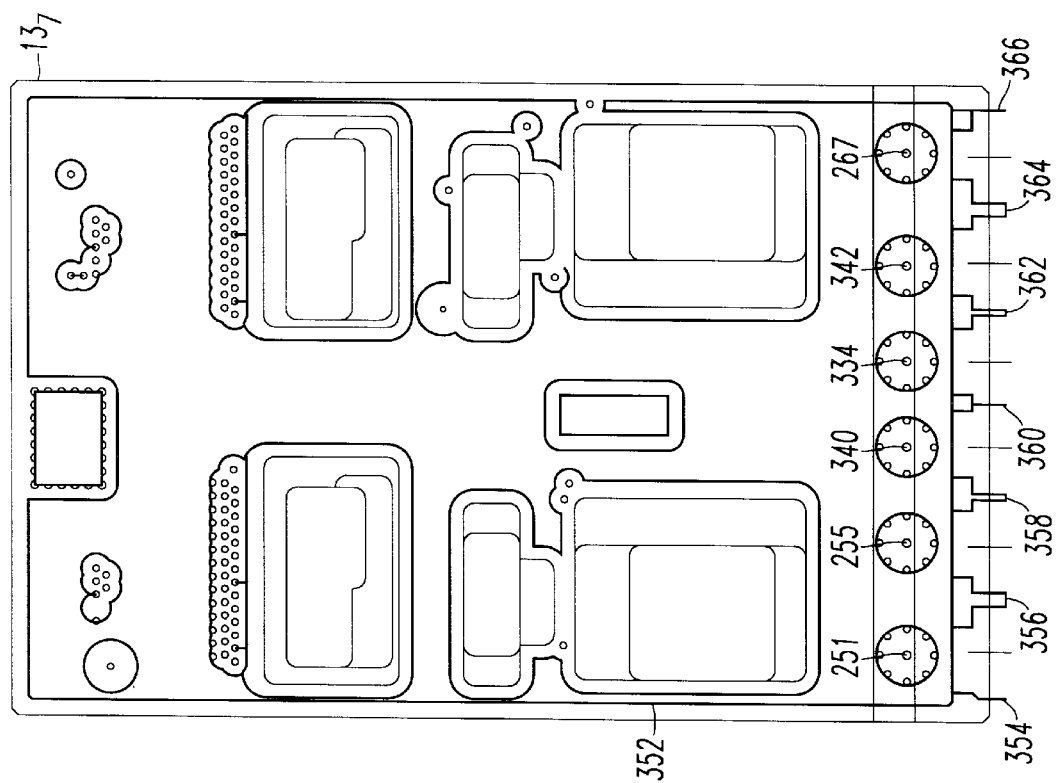
FIGS. 23A–23B are illustrative of via and ground metallization pattern formed in connection with HTCC layer 7 shown in FIG. 14.
Figure 23A:
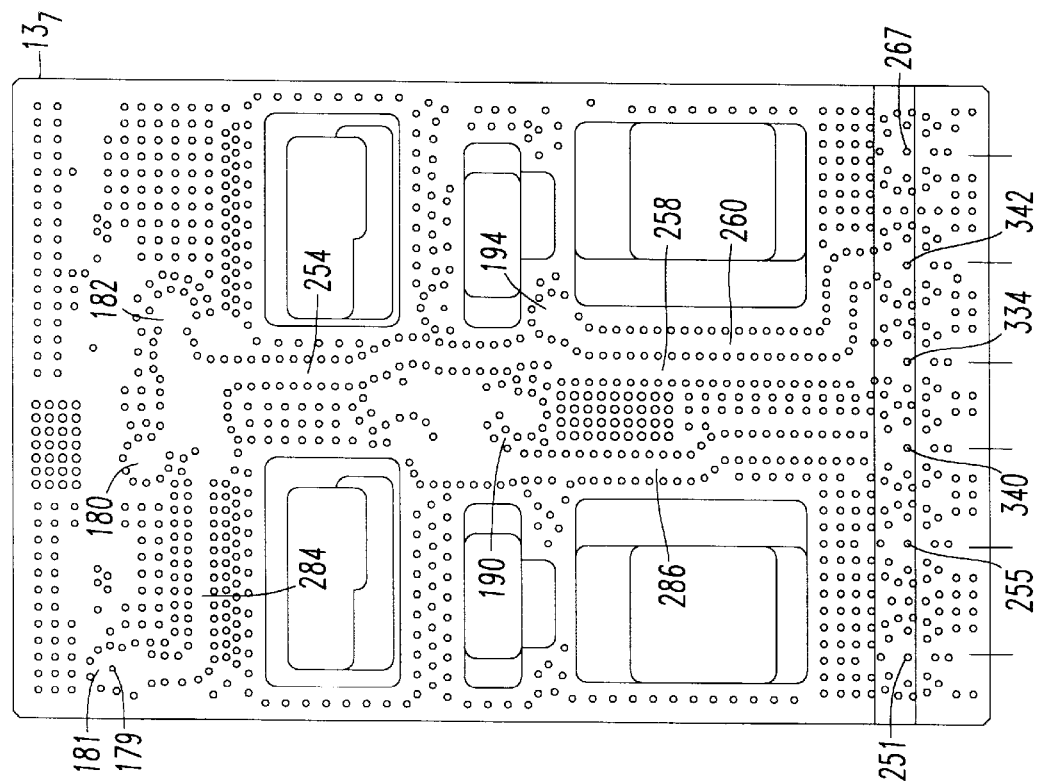

Layer $13_7$ comprises a second ground plane layer. It includes a via pattern as shown in FIG. 23A which substantially matches the via pattern in the underlying layer $13_6$ shown in FIG. 22A. FIG. 23B is illustrative of the metallization pattern formed on the top of layer $13_7$ and comprises a ground plane metallization 352 but now includes six(6) circular openings for the six vertical RF connector vias 251, 255, 267, 334, 340 and 342. The ground plane metallization 352 also includes seven(7) isolation stubs 354, 356, . . . 364, 366 which are located between the six(6) RF connectors $134_1$ . . . $134_6$ (FIG. 12D).

The upper HTCC layers $13_8$, $13_9$ and $13_{10}$ provide a level of routing of DC power and logic control signals between the various MMICs and ASICs as well as providing for connection of the pins $138_1$, $138_2$ . . . $138_6$ of the RF connectors $134_1$, $134_2$, . . . $134_6$ of the RF connector assembly 22 at the front portion 14 of the substrate 12.

Figure 24B:
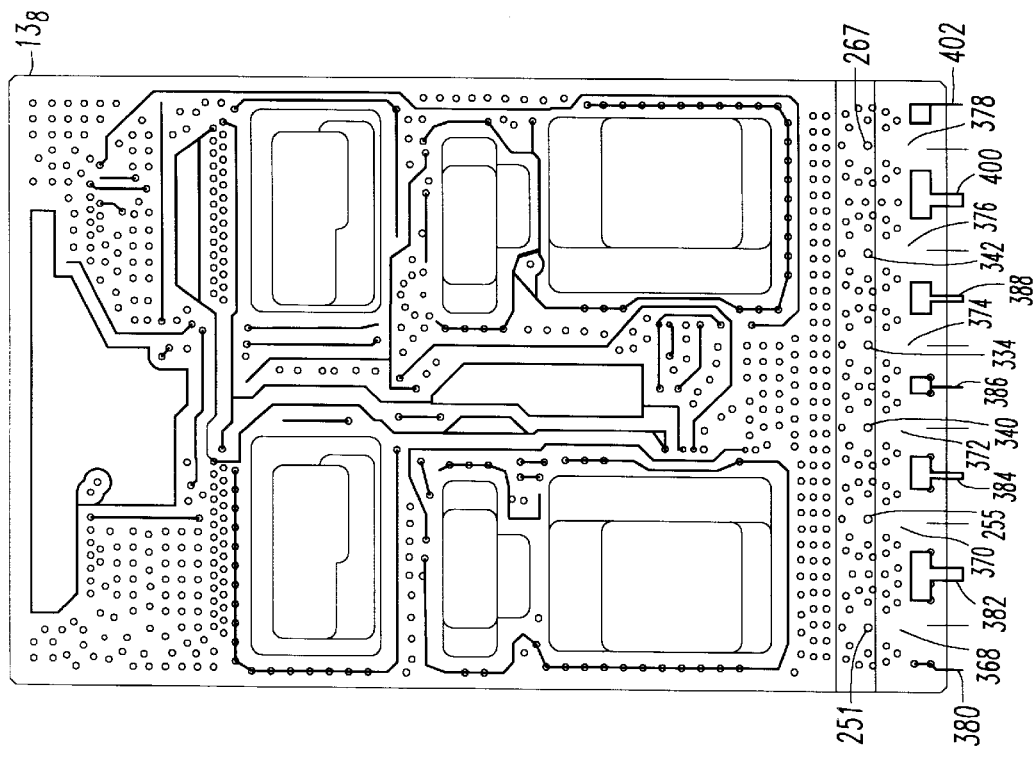
FIGS. 24A–24B are illustrative of via and top surface metallization pattern formed in connection with HTCC layer 8 shown in FIG. 14.
Figure 24A:
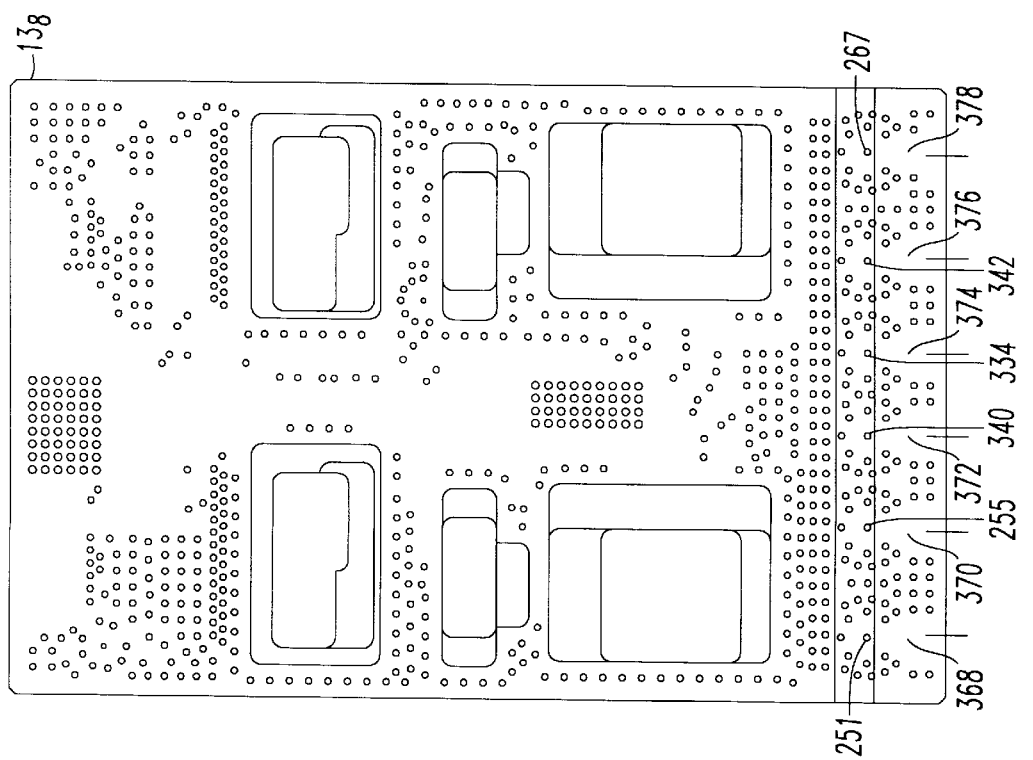
Figure 25B:
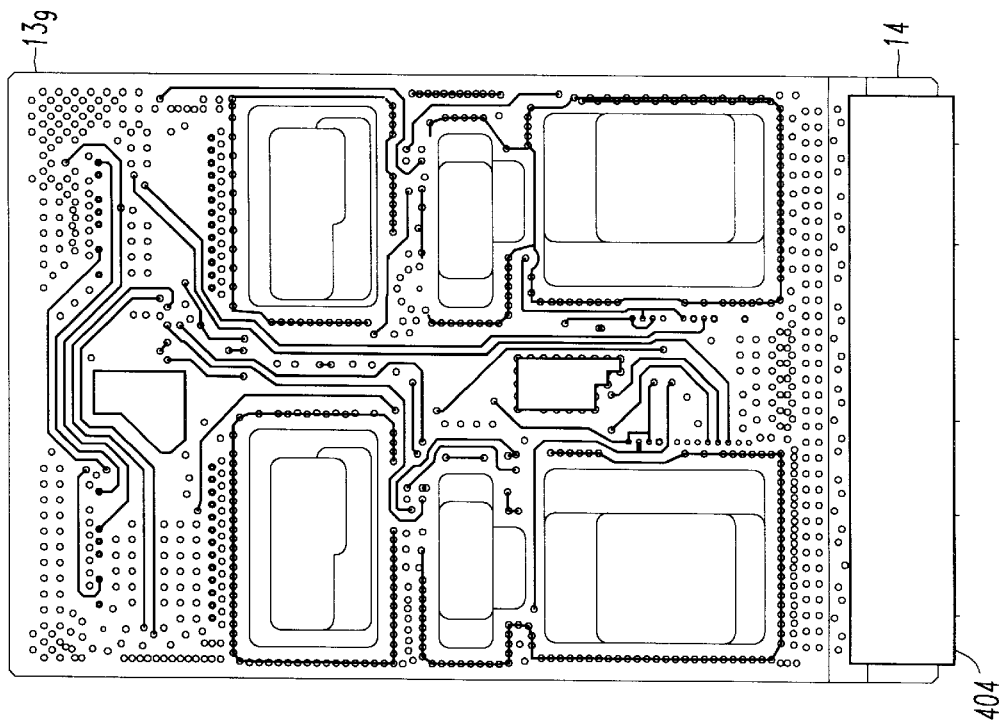
FIGS. 25A–25B are illustrative of via and top surface metallization pattern formed in connection with HTCC layer 9 shown in FIG. 14.
Figure 25A:
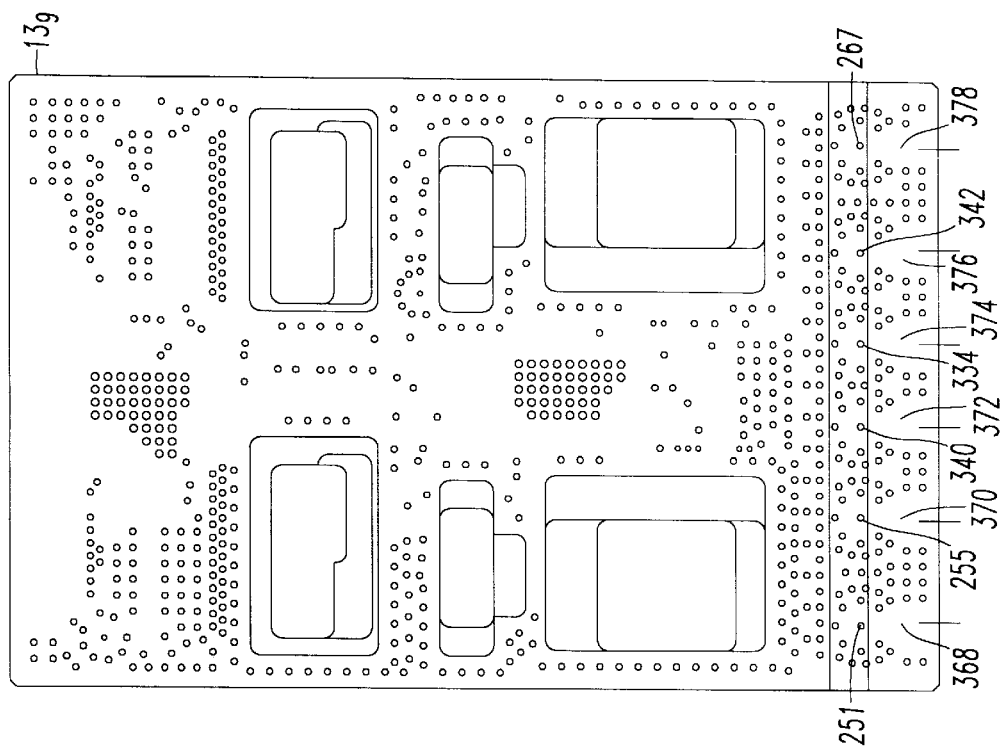

With respect to the ceramic layers $13_8$, and $13_9$, the pattern of vertical vias as shown in FIGS. 24A and 25A are similar but now include six(6) arcuate via patterns 368, 370 . . . 376, 378 forward of the vias 251 . . . 267 at the connector end of the substrate. However, the top surfaces thereof have selectively different patterns of stripline conductor metallization as shown in FIGS. 24B and 25B. The upper surface of metallization of layer $13_8$ as shown in FIG. 24B includes a conductor pattern of stripline conductors, isolation borders, as well as seven(7) connector pin isolation stubs 380 . . . 402 which match the stubs 354 . . . 366 of layer $13_7$ (FIG. 23B).

Figure 26B:
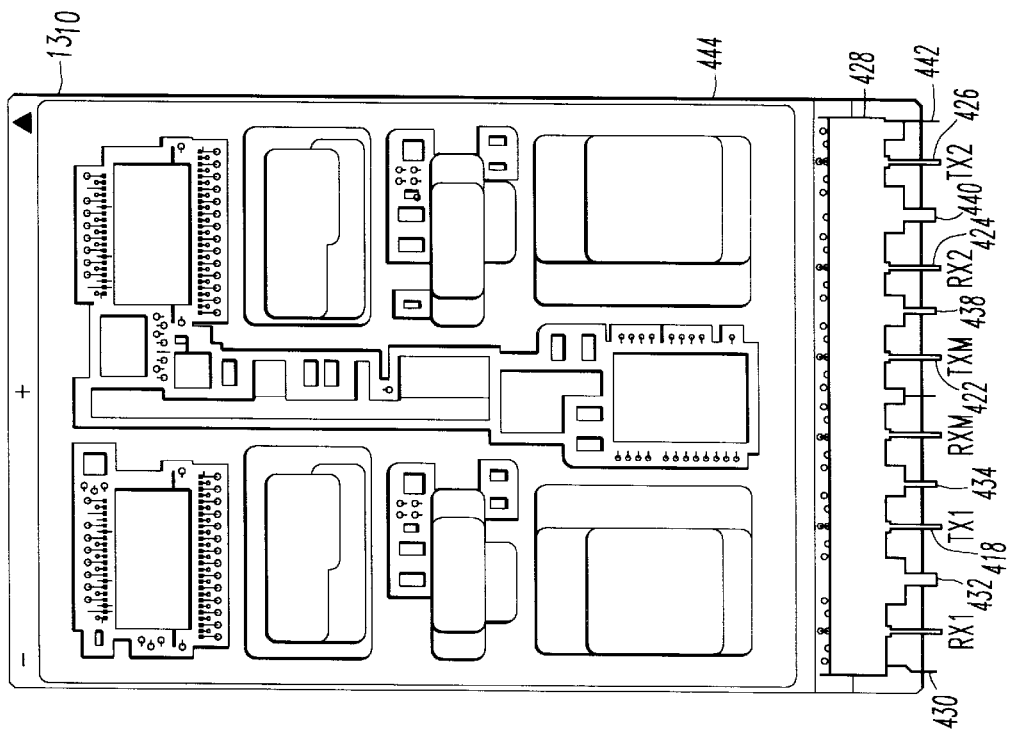
FIGS. 26A–26B are illustrative of via and ground metallization pattern formed in connection with HTCC layer 10 shown in FIG. 14.
Figure 26A:
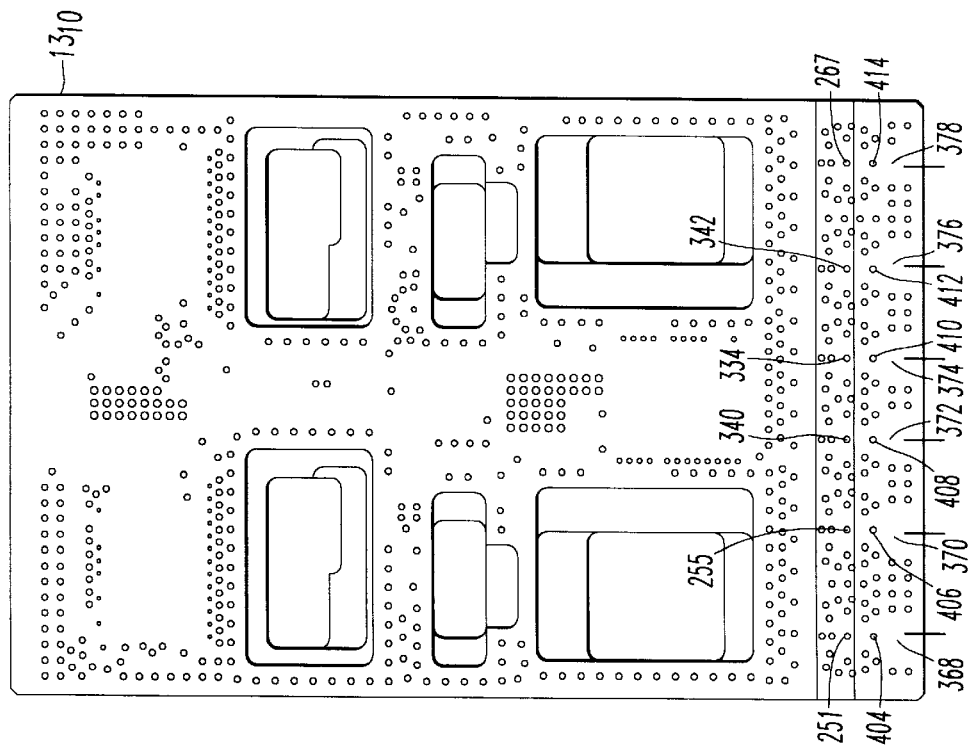

The via pattern for layer $13_{10}$ as shown in FIG. 26A is similar to the via pattern shown in FIG. 25A for the underlying layer $13_9$; however, in addition to the arcuate via patterns 368 . . . 378 included therein are vias 404 . . . 414 aligned with vias 251 . . . 267 and which are provided for mating with six stripline conductor elements 416 . . . 426 as shown in FIG. 26B. The six connector pins $138_1$, $138_2$ . . . $138_6$ are brazed to the stripline conductor elements 416 . . . 426 in the fabrication of the substrate 12.

A set of seven(7) pin isolation stubs 430 . . . 442 as shown in FIG. 26B are located between and insulated from the pin connector strips 416 . . . 426. A ground plane is further provided by a large metallization area shown by reference numeral 444, including openings formed therein for accommodating the MMICs and ASICs located in the cavities 100 . . . 110 of the substrate 12.

Figure 15:
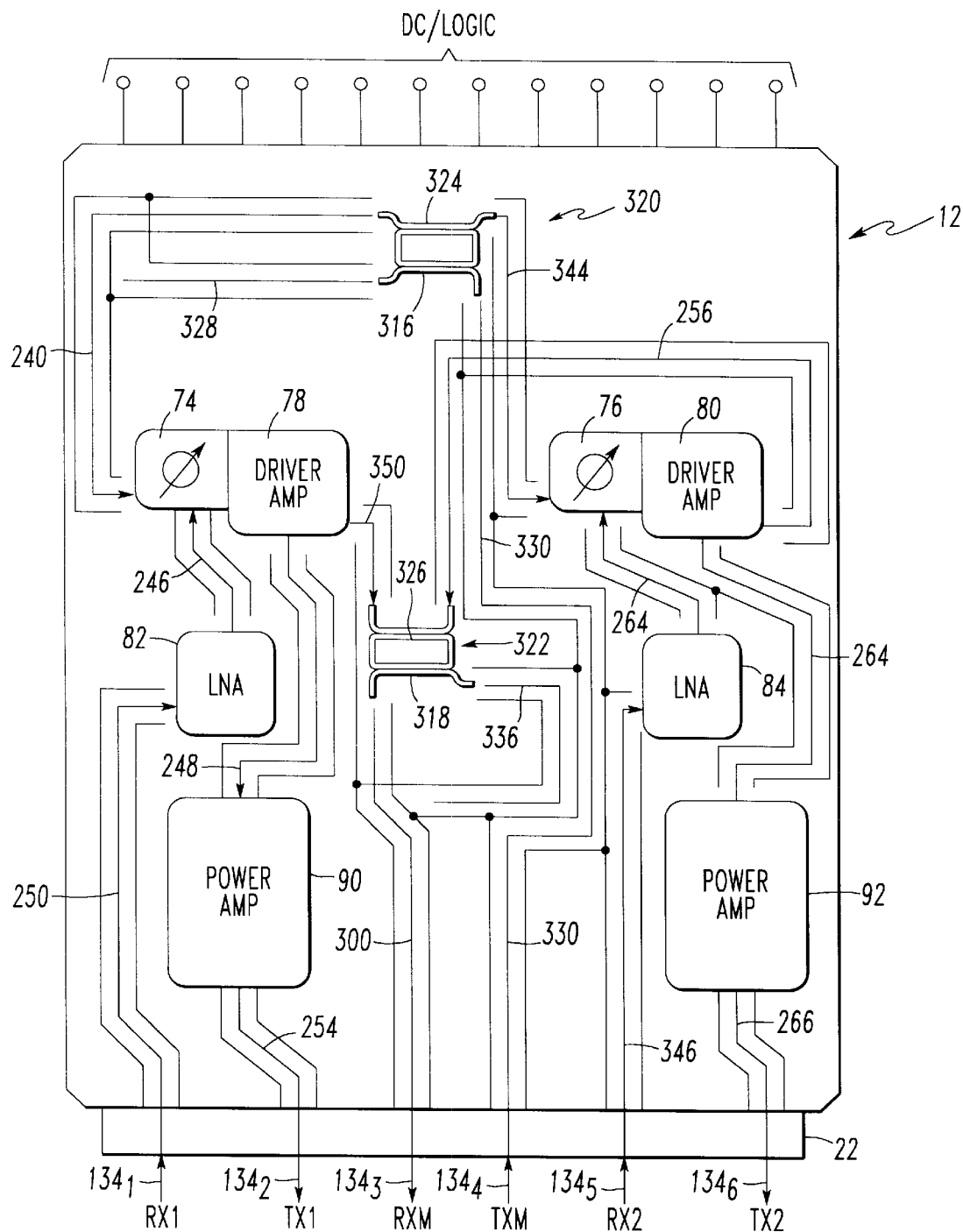
FIG. 15 is an electrical schematic diagram illustrative of the RF signal paths implemented within the package in accordance with the subject invention.

Having considered the structural details of HTCC layers $13_1$ . . . $13_{10}$, the RF signal paths implemented thereby are shown in the block diagram of FIG. 15. Returning now to FIG. 15, it can be seen that RF signals for two discrete T/R channels are coupled to and from the substrate 12 via connector assembly 22 located at one end of the substrate. DC power and logic control signals are applied to the substrate 12 at the other end as shown. The RF signal paths depicted in FIG. 15 can be found on the top surface of layer $13_2$ as shown in FIG. 18B and the top surfaces of layers $13_5$ and $13_6$ as shown in FIGS. 21B and 22B, respectively, and where, as noted before, RF routing is broken into two sections, a lower section including layers $13_1$, $13_2$, and $13_3$ and an upper section including layers $13_5$ and $13_6$. Layer $13_2$ of the bottom RF section is used primarily for routing RF signals between MMICs and to/from the connector assembly 22, while layers $13_5$ and $13_6$ of upper section are used for the implementation of the two manifold couplers 320 and 322. As noted above, layer $13_6$ is also used for routing the RF received signal for one of the channels.

Figure 16:
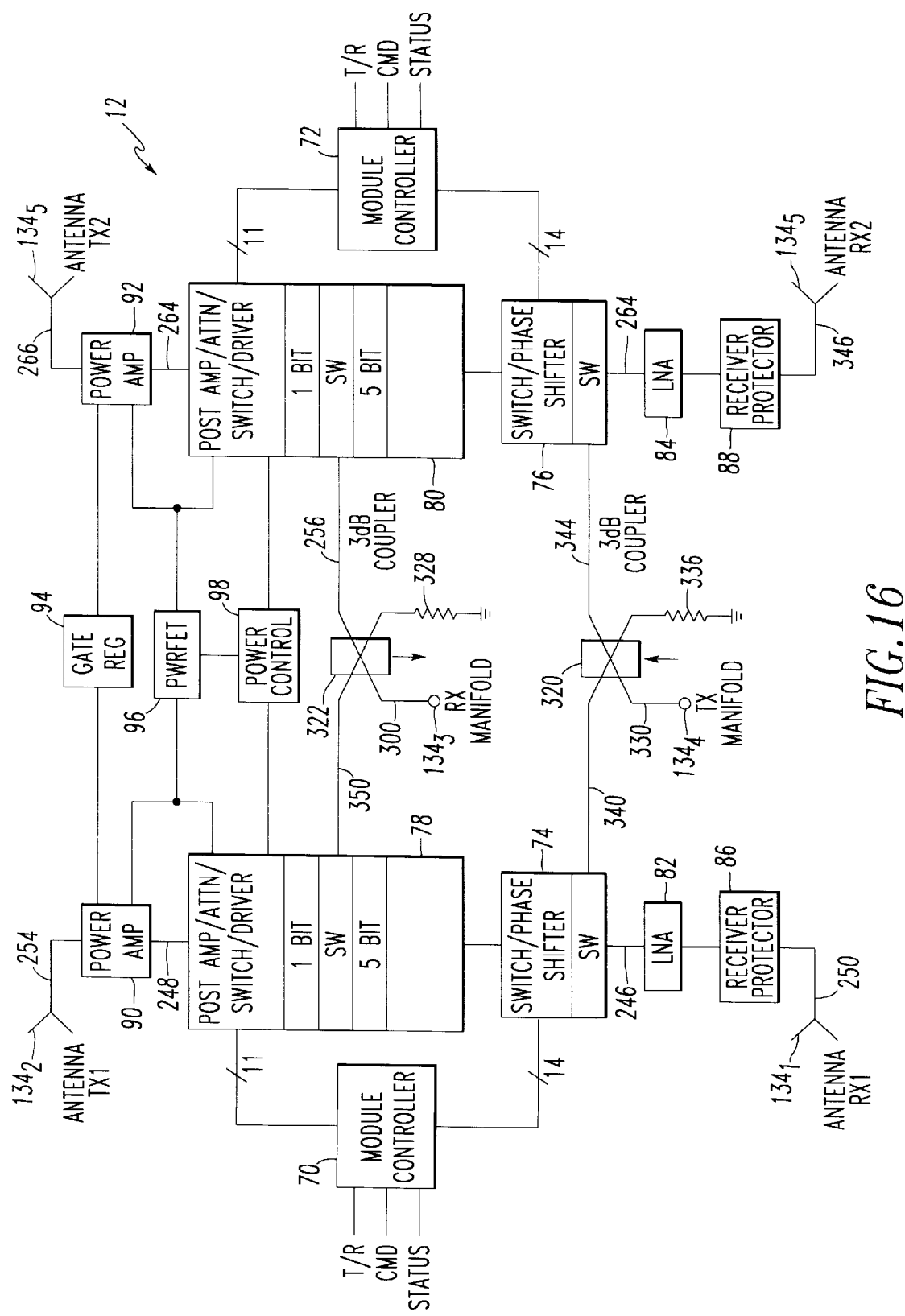
FIG. 16 is a simplified electrical block diagram of the dual channel T/R circuit architecture which is implemented with the components shown in FIG. 6.

Referring also back now to FIG. 16, shown thereat is the electrical architecture of the dual channel transmit/receive RF circuitry located on and within the substrate 12. The circuitry for each channel is substantially like that shown and described in U.S. Pat. No. 5,745,076, Turlington et al in that the same circuit components are respectively used in each channel for gain trim, phase shifting and intermediate power amplification during both the transmit modes of operation. However, each channel operates independently of the other, while sharing in a unique manner not only the transmit and receive manifolds by way of the RF couplers 320 and 322, but also the power and operation of the gate regulator 94, the POWERFET switch 96, and the power controller 98.

Accordingly, and as shown in FIG. 16, each channel includes: a receiver protector (R/P) element 86, 88; a low noise amplifier 82, 84 including two stages of amplification; an RF switch and phase shifter (SW/PHS) 74, 76 including a single pole double throw RF switch and a digitally controlled phase shifter; an amplifier/gain trim attenuator/ switch/driver amp (AMP/ATTN/SW/DVR) 78, 80 including three stages of pre amp or post amp amplification, a second single pole, double-throw switch located between a pair of digitally controlled gain trim attenuators and two stages of driver amplification; and a power amplifier 90, 92 including three stages of RF power amplification.

Beam control signals are fed from the beam steering controller 9 (FIG. 1) to separate module controllers 70 and 72 so as to respectively provide phase and amplitude control over RF transmit and receive signals in the respective T/R channels. However, the module controllers 70 and 72 preferably operate on a limited basis of shared module control via the power controller 98 by providing crossover channel control so that in the event one of the module controllers fails, the other module controller takes over. Further, either module controller 70 or 72 will shut down the entire module 10 upon the detection of certain conditions, in order to prevent faulty module operation from adversely affecting the accuracy of overall beam control.

The use of a multi-layer substrate which may be implemented as an MLCC such as an HTCC structure provides a number of attendant advantages in terms of design flexibility, performance and at lower cost. The multi-layer nature of the structure permits isolated crossovers of both RF and DC, due to the fact that ground planes are located between signal lines. The overall density of the assembly is increased due to both the ability to integrate certain passive microwave components, and the ability to perform 3-D routing of both RF and DC signals.

In the present invention, fewer modules need to be assembled and tested per application site, thereby providing a first order of savings. In addition, the T/R modules 10 can be structured for ease of module assembly and ease of assembly of the module into the antenna array. As a result of improved T/R circuitry architecture and improved layout architecture achieved, the invention further enables performance and cost improvements to be realized in a multichannel T/R module which can be conveniently plugged into an antenna assembly while making electrical and heat sink connections simultaneously between the module and the assembly. Importantly, RF connections are made with high stability against vibration, thereby supporting quality RF signal processing, and the heat sink connection is made with large surface contact area, thereby supporting higher heat dissipation, reduced rise in junction temperatures of module semiconductor devices, and higher module RF power capability.

Having thus shown and described what is at present considered to be the preferred embodiment of the invention, it should be noted that the same has been made by way of illustration and not limitation. Accordingly, all modifications, alterations and changes coming within the spirit and scope of the invention as set forth in the appended claims are meant to be included.

We claim:

1. A transmit/receive (T/R) module for an active aperture of a radar system, comprising:

a substrate having two opposing end regions;

an RF interface located at one of said end regions;

a DC/logic interface located at the other of said end regions;

a plurality of cavities formed in the substrate;

an outer heat sink plate bonded to the substrate and covering said plurality of cavities;

at least one T/R channel circuit implemented on said substrate and including a plurality of circuit components;

wherein a selected number of said plurality of circuit components are located in said cavities and are mounted directly on the heat sink plate.

2. A T/R module according to claim 1 wherein said at least one T/R channel circuit comprises a plurality of T/R channel circuits.

3. A T/R module according to claim 1 wherein said at least one T/R channel circuit comprises two T/R channel circuits.

4. A T/R module according to claim 1 wherein said substrate comprises a co-fired multi-layer ceramic structure.

5. A T/R module according to claim 1 wherein said substrate comprises a multi-layer laminated or molded conductor/dielectric structure.

6. A T/R module according to claim 1 and additionally including a ring frame member bonded on the top of the substrate and a top cover member bonded on the ring frame member for forming a sealed package and mutually isolating said cavities from each other.

7. A T/R module according to claim 1 wherein said RF interface includes RF connector means for coupling RF signals to and from said T/R channel circuits.

8. A T/R module according to claim 7 wherein said connector means comprises a plurality of blind mate press-on RF connectors arranged in a row across an end face of the substrate.

9. A T/R module according to claim 1 wherein said DC/logic interface includes means connected to the substrate for supplying additional power to the T/R channel circuit during peak power operation for RF pulse transmission.

10. A T/R module according to claim 9 wherein said means for supplying additional power comprises a bank of capacitors which are chargeable from an external DC power source.

11. A package for a transmit/receive (T/R) module, comprising:

a common substrate for two discrete T/R channels, having a relatively thin profile and being comprised of a plurality of laminated ceramic layers, each having a predetermined pattern of electrical vias therethrough and a predetermined pattern of metallization at least on one surface thereof, for providing three dimensional routing of signals and power between the layers of the substrate and further including two like sets of multi-level cavities formed therein, one set for each said T/R channel, arranged side by side and in which one or more active circuit components are respectively located;

a ring frame member located on top of said substrate, bordering a major portion of the outer periphery of the substrate as well as encircling the two sets of cavities;

a cover member located on said ring frame, said cover member enclosing and mutually isolating the cavities of said two sets of cavities from each other;

a heat sink plate on an underside surface of the substrate and also covering an area including the two sets of cavities, said active circuit components being in direct contact with said heat sink plate and which thereby provides a thermal interface to an external heat exchanger;

connector means including a plurality of discrete signal connectors located at one end of the substrate for independently coupling RF signals to and from both said T/R channels; and means at the opposite end of the substrate for receiving externally generated DC power and operational logic control signals for said active circuit components of both said T/R channels.

12. A package according to claim 11 wherein said cover member is bonded to said ring frame member and wherein said ring frame member, said heat sink plate, and said connector assembly are bonded to said substrate so as to form a hermetically sealed T/R package.

13. A package according to claim 12 wherein said cover member includes a generally flat outer surface.

14. A package according to claim 12 wherein said heat sink plate includes generally flat inner and outer surfaces and wherein said active circuit components are located on said flat inner surface of the heat sink plate.

15. A package according to claim 11 wherein said plurality of ceramic layers are comprised of high temperature cofired ceramic (HTCC).

16. A package according to claim 15 wherein each set of cavities includes three mutually aligned multi-level cavities, said cavities having intermediate levels for providing external connections to the respective active circuit components located in the cavities and for mounting passive circuit components thereon.

17. A package according to claim 15 wherein a first cavity of each said set includes therein a first active circuit component implementing an RF preamplifier in a transmit mode and postamplifier in a receive mode, a signal attenuator, a switch and an RF driver amplifier and a second active circuit component implementing another RF switch and a phase shifter, wherein a second cavity of each said set includes therein an active circuit component implementing a low noise amplifier, and wherein a third cavity of each said set includes an active circuit component implementing an RF output power amplifier.

18. A package according to claim 17 wherein said active circuit components comprise monolithic microwave integrated circuits (MMICs).

19. A package according to claim 17 and additionally including a pair of module controllers located on said substrate for controlling said two T/R channels.

20. A package according to claim 17 and additionally including a pair of non-cavity regions at said opposite end of said two sets of cavities for locating thereat a respective active circuit component implementing module controllers for the two T/R channels.

21. A package according to claim 20 wherein the active circuit component at said non-cavity regions comprise application specific integrated circuits (ASICs).

22. A package according to claim 20 and further including a non-cavity region between said two sets of cavities and said pair of non-cavity regions for locating thereat active circuit components for implementing a gate regulator, a DC power controller, a power switch which are commonly utilized by both said T/R channels.

23. A package according to claim 15 and wherein said connector means comprises an RF connector assembly including a first pair of RF input and output connectors for one of said two T/R channels, a second pair of RF input and output connectors for the other of said T/R channels, an RF receive manifold connector for both said T/R channels, and an RF transmit manifold connector for both said T/R channels.

24. A package according to claim 23 wherein all of said connectors are linearly arranged side by side and located in a common shroud.

25. A package according to claim 24 wherein said connectors comprise blind mate connectors for facilitating relatively easy connection to an antenna array.

26. A package according to claim 25 wherein said blind mate connectors comprise press-on connectors.

27. A package according to claim 23 and wherein said plurality of ceramic layers of HTCC includes at least two sets of layers for providing at least two levels of RF signal routing in the substrate and at least one set of layers for providing at least one level of DC power and control signal routing in the substrate.

28. A package according to claim 27 and wherein said plurality of layers of HTCC include a layer between said sets of layers having an electrical shielding or ground plane metallization pattern.

29. A package according to claim 27 wherein one set of said two sets of layers providing RF signal routing couples RF signals between predetermined RF input and output connectors of said connector assembly and predetermined active circuit components of said T/R channels.

30. A package according to claim 29 wherein the other set of said two sets of layers include a first and a second stripline RF signal coupler formed between two adjacent layers of said other set of layers for respectively coupling RF signals between said receive manifold connector and said transmit manifold connector and predetermined active components of said T/R channels.

31. A package according to claim 30 wherein said two sets of layers providing two levels of RF signal routing comprise two adjacent levels of signal routing below said one set of layers providing said one level of DC power and control signal routing.

32. A package according to claim 27 wherein said two sets of layers providing RF signal routing include multiple pairs of parallel lines of electrical vias and respective stripline conductors overlaying said parallel lines of electrical vias for providing a predetermined number of shielded conduits surrounding a selected number of RF signal stripline conductors along their length.

33. A package according to claim 27 wherein said layers include one or more generally circular patterns of electrical vias and an electrical via centralized therein for providing respective shielded conductor crossovers between layers for effecting three dimensional routing of signals and power within the substrate.

34. A package according to claim 11 wherein said means at the opposite end of the substrate for receiving DC power and logic control signals includes a metallization pattern on the outer surface of a lowermost layer of said substrate.

35. A package according to claim 34 wherein said means for receiving externally generated DC power and control signals additionally includes a spring contact assembly electrically coupled to said metallization pattern and connectable to an external source of DC power and an external source of T/R channel control signals.

36. A package according to claim 11 and additionally including external energy storage means connected to said means for receiving externally generated DC power for supplying additional DC power to the package.

37. A dual channel transmit/receive (T/R) module exhibiting a relatively thin profile, comprising:

a common substrate for two discrete T/R channels, including a plurality of laminated ceramic layers, each having a predetermined pattern of electrical vias therethrough and a predetermined pattern of metallization at least on one surface thereof, for providing three dimensional routing of signals and power between the layers of the substrate and further including two like sets of multilevel cavities formed therein, one set for each said T/R channel, arranged side by side and in which one or more active circuit components are respectively located;

a ring frame member bonded to the top of said substrate, said ring frame member bordering a major portion of the outer periphery of the substrate as well as encircling the two sets of cavities;

a cover member bonded to said ring frame member and covering an area including the two sets of cavities;

a heat sink plate bonded to the underside surface of the substrate and also covering an area including the two sets of cavities, said active circuit components being in direct contact with said heat sink plate and which thereby provides a thermal interface to an external heat exchanger;

a unitary RF connector assembly including a plurality of discrete signal connectors located at one end of the substrate for independently coupling RF signals to and from said T/R channels;

a power and logic interface at the opposite end of the substrate for coupling DC power and operational control signals to said active circuit components located on the substrate; and energy storage means located at the opposite end of the substrate for supplying supplementary DC power to said active circuit components located on the substrate.

38. A dual channel T/R module according to claim 37 wherein said plurality of ceramic layers are comprised of high temperature cofired ceramic (HTCC) material.

39. A dual channel T/R module according to claim 38 wherein said ring frame member and said cover member are comprised of electrically conductive material and wherein said cover member is bonded on said ring frame member so as to form a seal thereat and wherein said ring frame member, said heat sink plate and said connector assembly are brazed on said substrate so as to form a hermetically sealed T/R package.

40. A dual channel T/R module according to claim 39 wherein said cover member includes a generally flat outer surface and wherein said heat sink plate includes generally flat inner and outer surfaces and wherein said active circuit components are located on said flat inner surface of the heat sink plate.

41. A dual channel T/R module according to claim 37 wherein said energy storage means comprise a plurality of storage capacitors.

42. A dual channel T/R module according to claim 41 wherein said plurality of capacitors are located in a support housing attached to said substrate.

43. A dual channel T/R module according to claim 42 wherein said DC power includes at least one DC supply voltage and wherein said plurality of capacitors includes at least one capacitor for said at least one DC supply voltage.

44. A dual channel T/R module according to claim 38 wherein each set of cavities includes three multi-level cavities having intermediate levels for providing external wire connections to the respective active circuit components located in the cavities and for mounting passive circuit components thereon.

45. A dual channel T/R module according to claim 44 wherein each set of three cavities are mutually aligned along a side edge of the substrate and wherein a first cavity of each said set includes therein a first active circuit component implementing an RF preamplifier in a transmit mode and post amplifier in a receive mode, a signal attenuator, a switch and an RF driver amplifier and a second active circuit component implementing another RF switch and a phase shifter, wherein a second cavity of each said set includes therein an active circuit component implementing a low noise amplifier, and wherein a third cavity of each said set includes an active circuit component implementing an RF output power amplifier.

46. A dual channel T/R module according to claim 45 wherein said active circuit components comprise monolithic microwave integrated circuits (MMICs).

47. A dual channel T/R module according to claim 45 and additionally including a pair of non-cavity regions at said opposite end of said two sets of cavities for locating thereat a respective active circuit component implementing module controllers for the two T/R channels.

48. A dual channel T/R module according to claim 47 wherein the active circuit component at said non-cavity regions comprise application specific integrated circuits (ASICs).

49. A dual channel T/R module according to claim 47 and further including a non-cavity region between said two sets of cavities and said pair of non-cavity regions for locating thereat active circuit components for implementing a gate regulator, a DC power controller, a power switch which are commonly utilized by both said T/R channels.

50. A dual channel T/R module in accordance with claim 49 wherein said active circuit components at said non-cavity regions comprise application specific integrated circuits (ASICs).

51. A dual channel T/R module according to claim 37 and wherein said connector assembly comprises a first pair of RF input and output connectors for one of said two T/R channels, a second pair of RF input and output connectors for the other of said T/R channels, an RF receive manifold connector for both said T/R channels, and an RF transmit manifold connector for both said T/R channels, and wherein said connectors comprise blind mate connectors for facilitating relatively easy connection to an antenna array.

52. A dual channel T/R module according to claim 51 wherein all of said connectors are mutually aligned and located in a common shroud.

53. A dual channel T/R module according to claim 52 and wherein said plurality of ceramic layers of HTCC includes two sets of layers for providing two levels of RF signal routing in the substrate and one set of layers for providing DC power and control signal routing in the substrate and further including a layer of HTCC between said sets of layers having an electrical shielding or ground plane metallization pattern.

54. A dual channel T/R module according to claim 53 wherein one set of said two sets of layers providing RF signal routing couples RF signals between predetermined RF input and output connectors of said connector assembly and predetermined active circuit components of said T/R channels wherein the other set of said two sets of layers include a first and a second stripline RF signal coupler formed between two adjacent layers of said other set of layers for respectively coupling RF signals between said receive manifold connector and said transmit manifold connector and predetermined active components of said T/R channels.

55. A dual channel T/R module according to claim 54 wherein said two sets of layers providing two levels of RF signal routing comprise two adjacent levels of signal routing below said one set of layers providing said one level of DC power and control signal routing.

56. A dual channel T/R module according to claim 53 wherein said two sets of layers providing RF signal routing include multiple pairs of parallel lines of electrical vias and respective stripline conductors overlaying said parallel lines of electrical vias for providing a predetermined number of shielded channels surrounding respective RF signal stripline conductors located therein wherein said plurality of layers selectively include one or more generally circular patterns of electrical vias and an electrical via centralized therein for providing respective shielded conductor crossovers between layers for effecting three dimensional routing of signals and power within the substrate.

57. An electrical energy storage assembly for supplying supplementary DC power to a transmit/receive (T/R) module during peak power operation, comprising:
 a base member comprised of electrical insulation material and having a pair of opposed mounting surfaces;
 a first plurality of electrical contact elements located on one of said mounting surfaces for connection to an electronic circuit assembly of the T/R module;
 a second plurality of electrical contact elements located on the other of said mounting surfaces for connection to at least one external DC power source and an external source of control signals;
 a plurality of electrical vias through the base member for selectively interconnecting the first and second plurality of electrical contact elements;
 a plurality of electrical energy storage elements mounted on one of said mounting surfaces; and
 wherein one side of said energy storage elements are connected to predetermined ones of said first plurality of contact elements on one of said mounting surfaces and wherein the other side of said energy storage elements are connected to predetermined ones of said second plurality of contact elements on the other of said mounting surfaces.

58. An electrical energy storage assembly according to claim 57 wherein said energy storage elements comprise electrical capacitors.

59. An electrical energy storage assembly according to claim 57 wherein said base member comprises a relatively thin flat plate member.

60. An electrical energy storage assembly according to claim 59 wherein said first plurality of electrical contact elements comprise a pattern of conductor segments.

61. An electrical energy storage assembly according to claim 60 wherein said second plurality of electrical contact elements comprise a set of mutually parallel resilient contact members.

62. An electrical storage assembly according to claim 61 wherein said resilient contact members comprises a set of bowed finger contact elements having a folded back end portion.

63. An electrical storage assembly according to claim 62 and additionally including a protective member attached to the base member for protecting the end portion of each said finger contact element.

64. An electrical storage assembly according to claim 63 wherein said protective member comprises a generally flat member of a predetermined thickness and including a set of parallel apertures therein and through which said end portions protrude.

65. An electrical storage assembly according to claim 60 where a predetermined number of said electrical storage elements are connected in parallel between said pattern of stripline conductor segments and said set of resilient contact members.

66. An electrical storage assembly according to claim 65 wherein said electrical energy storage elements comprise storage capacitors.

67. An electrical storage assembly according to claim 66 and additionally including a respective electrical fuse connected in series with each of said storage capacitors.

68. An electrical storage assembly according to claim 67 and additionally including a protective member attached to the base member for protecting said storage capacitors and said fuses.

69. An electrical storage assembly according to claim 68 wherein said protective member comprises a cowling type of member which fits around said storage capacitors and said fuses.

70. An active aperture for a radar system, comprising:
an array of antenna elements; and
an array of dual channel transmit/receive (T/R) modules for transmitting RF signals to and receiving RF signals from said array of antenna elements.

71. An active aperture according to claim 70 wherein said array of antenna elements comprises a phased array.

72. An active aperture according to claim 71 wherein each T/R module includes:
a common substrate for two discrete T/R channels, including a plurality of laminated ceramic (HTCC) layers, each having a predetermined pattern of electrical vias therethrough and a predetermined pattern of metallization at least on one surface thereof, for providing three dimensional routing of signals and power between the layers of the substrate and further including two like sets of multilevel cavities formed therein, one set for each said T/R channel, arranged side by side and in which one or more active circuit components are respectively located;
a heat sink plate bonded to the underside surface of the substrate and also covering an area including the two sets of cavities, said active circuit components being in direct contact with said heat sink plate and which thereby provides a thermal interface to an external heat exchanger;
a unitary RF connector assembly including a plurality of discrete signal connectors located at one end of the substrate for independently coupling RF signals to and from said T/R channels;
a power and control interface at the opposite end of the substrate for coupling DC power and operational control signals to said active circuit components located on the substrate.

73. An active aperture according to claim 72 and wherein each T/R module additionally includes:
a metallized ring frame member bonded to the top of said substrate, said ring frame member bordering a major portion of the outer periphery of the substrate as well as encircling the two sets of cavities;
a metallized cover member bonded to said ring frame member and covering an area including the two sets of cavities.

74. An antenna system according to claim 73 wherein said cover member includes a generally flat outer surface and wherein said heat sink plate includes generally flat inner and outer surfaces and wherein said active circuit components are located on said flat inner surface of the heat sink plate.

75. An active aperture according to claim 72, and additionally including,
energy storage means located off of and at the opposite end of the substrate for supplying supplementary DC power to said active circuit components located on the substrate.

76. An active aperture according to claim 75 wherein said energy storage means comprise capacitive means.

77. An active aperture according to claim 76 wherein said capacitive means comprises a bank of electrical capacitors.

78. An active aperture according to claim 75 wherein capacitive energy storage means includes a plurality of capacitors located in a support housing attached to said substrate.

79. An active aperture according to claim 72 wherein each set of cavities includes three multi-level cavities having intermediate levels for providing external wire connections to the respective active circuit components located in the cavities and for mounting passive circuit components thereon.

80. An active aperture according to claim 79 wherein each set of three cavities are mutually aligned along a side edge of the substrate and wherein a first cavity of each said set includes therein a first active circuit component implementing an RF preamplifier in a transmit mode and post amplifier in a receive mode, a signal attenuator, a switch and an RF driver amplifier and a second active circuit component implementing another RF switch and a phase shifter, wherein a second cavity of each said set includes therein an active circuit component implementing a low noise amplifier, and wherein a third cavity of each said set includes an active circuit component implementing an RF output power amplifier.

81. An active aperture according to claim 80 and additionally including a pair of non-cavity regions at said opposite end of said two sets of cavities for locating thereat a respective active circuit component implementing module controllers for the two T/R channels.

82. An active aperture according to claim 81 and further including a non-cavity region between said two sets of cavities and said pair of non-cavity regions for locating thereat active circuit components for implementing a gate regulator, a DC power controller, a power switch which are commonly utilized by both said T/R channels.

83. An active aperture according to claim 72 and wherein said connector assembly comprises a first pair of RF input and output connectors for one of said two T/R channels, a second pair of RF input and output connectors for the other of said T/R channels, an RF receive manifold connector for both said T/R channels, and an RF transmit manifold connector for both said T/R channels, and wherein said connectors comprise blind mate press-on connectors for facilitating relatively easy connection to an antenna array, and wherein all of said connectors are mutually aligned and located in a common shroud.

84. An active aperture according to claim 72 wherein all of said plurality of ceramic HTCC layers includes at least one set of layers for providing at least one level of RF signal routing in the substrate and at least one layer for providing at least one level of DC power and control signal routing in the substrate.

85. An antenna system according to claim 84 wherein one set of said two sets of layers providing RF signal routing couples RF signals between predetermined RF input and output connectors of said connector assembly and predetermined active circuit components of said T/R channels wherein the other set of said two sets of layers include a first stripline RF signal coupler acting as a signal combiner and a second stripline RF signal coupler acting as a signal splitter formed between two adjacent layers of said other set of layers for respectively coupling RF signals between said receive manifold connector and said transmit manifold connector and predetermined active components of said T/R channels.

* * * * *

UNITED STATES PATENT AND TRADEMARK OFFICE
CERTIFICATE OF CORRECTION

PATENT NO. : 6,114,986
DATED : September 5, 2000
INVENTOR(S) : John W. Cassen, et al It is certified that error appears in the above-identified patent and that said Letters Patent is hereby corrected as shown below: On the title page: Item

[75] Inventors, add the name "George T. Hall"

Signed and Sealed this

Twenty-fourth Day of April, 2001

Attest:

NICHOLAS P. GODICI

Attesting Officer        Acting Director of the United States Patent and Trademark Office